(12) United States Patent
Epstein et al.

(10) Patent No.: US 11,099,314 B2
(45) Date of Patent: Aug. 24, 2021

(54) LIGHT CONTROL FILM WITH TURNING FILM AND LENTICULAR DIFFUSER FOR VIEW ENHANCEMENT IN THE HORIZONTAL PLANE

(71) Applicant: 3M INNOVATIVE PROPERTIES COMPANY, St. Paul, MN (US)

(72) Inventors: Kenneth A. Epstein, St. Paul, MN (US); Nicholas A. Johnson, Burnsville, MN (US); Robert M. Emmons, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/475,327

(22) PCT Filed: Jan. 3, 2018

(86) PCT No.: PCT/US2018/012218
§ 371 (c)(1),
(2) Date: Jul. 1, 2019

(87) PCT Pub. No.: WO2018/129068
PCT Pub. Date: Jul. 12, 2018

(65) Prior Publication Data
US 2019/0339438 A1 Nov. 7, 2019

Related U.S. Application Data

(60) Provisional application No. 62/442,332, filed on Jan. 4, 2017, provisional application No. 62/608,513, filed on Dec. 20, 2017.

(51) Int. Cl.
*F21V 8/00* (2006.01)

(52) U.S. Cl.
CPC ......... *G02B 6/0051* (2013.01); *G02B 6/0038* (2013.01); *G02B 6/0053* (2013.01)

(58) Field of Classification Search
CPC .................................................... G02B 6/0053
See application file for complete search history.

(56) References Cited

U.S. PATENT DOCUMENTS 7,833,662 B2  11/2010  Kim
9,360,592 B2   6/2016  Hunt
(Continued)

FOREIGN PATENT DOCUMENTS

CN         102323690         1/2012

OTHER PUBLICATIONS

International Search Report for PCT International Application No. PCT/US2018/012218, dated Apr. 29, 2018, 3 pages.

*Primary Examiner* — Edmond C Lau
(74) *Attorney, Agent, or Firm* — Michael Stern

(57) ABSTRACT

Optical system including a lightguide; a turning film, including a first smooth surface perpendicular to a display axis and a first structured surface including a plurality of first microstructures defining a first plurality of parallel grooves, where the turning film is optically coupled to the lightguide, where the turning film outputs light collimated in a first plane parallel to the display axis; and a lenticular diffuser, including a second smooth surface perpendicular to the display axis and a second structured surface comprising a plurality of second microstructures defining a second plurality of parallel grooves extending along a plane perpendicular to the display axis, where the lenticular diffuser is optically coupled to the turning film, where the lenticular diffuser reflects or refracts collimated light toward a second plane (Continued)

perpendicular to the first plane; where the first plurality of parallel grooves is perpendicular to the second plurality of parallel grooves.

21 Claims, 23 Drawing Sheets

(56) References Cited

U.S. PATENT DOCUMENTS

| | | | |
|---|---|---|---|
| 2004/0080938 A1* | 4/2004 | Holman | G02B 27/1046 362/231 |
| 2005/0041311 A1 | 2/2005 | Mi | |
| 2005/0254259 A1* | 11/2005 | Yamashita | G02B 6/0053 362/621 |
| 2008/0259634 A1* | 10/2008 | Mi | G02B 6/0053 362/606 |
| 2009/0180191 A1* | 7/2009 | Yamada | G02F 1/133611 359/625 |
| 2010/0321609 A1 | 12/2010 | Qi | |
| 2011/0234580 A1 | 9/2011 | Wang | |
| 2014/0119033 A1* | 5/2014 | Vasylyev | G02B 6/001 362/327 |
| 2017/0264072 A1* | 9/2017 | Chang | G02B 5/0268 |

* cited by examiner

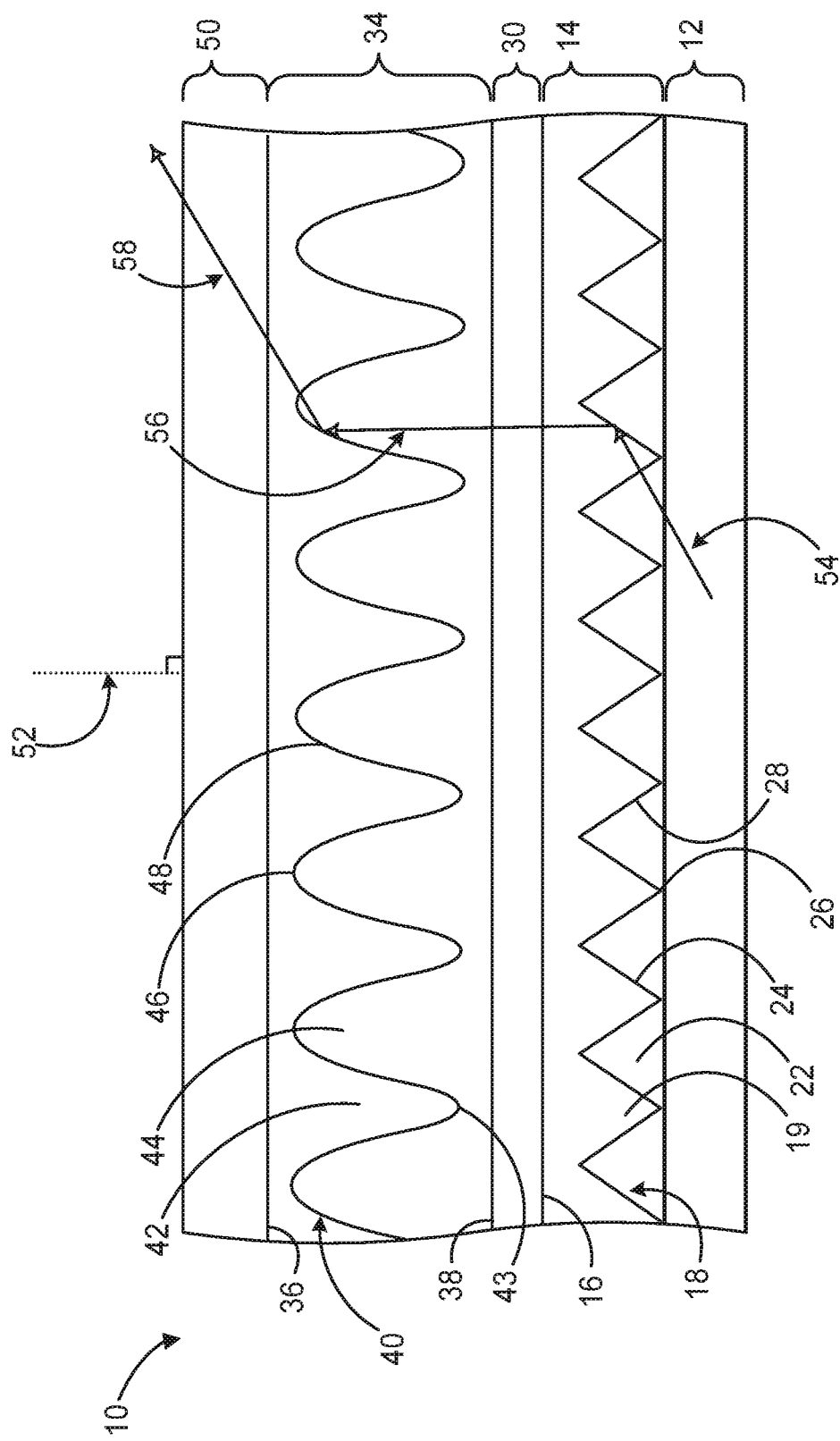

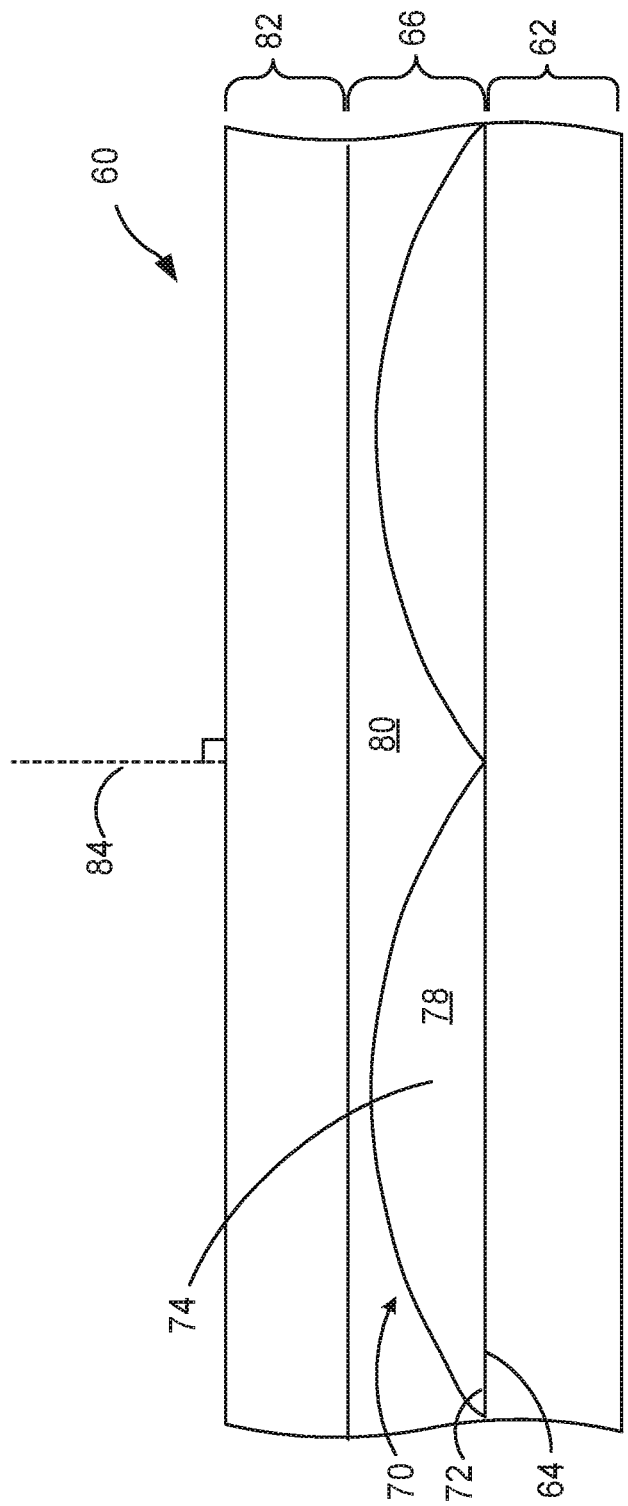

LIGHT CONTROL FILM WITH TURNING FILM AND LENTICULAR DIFFUSER FOR VIEW ENHANCEMENT IN THE HORIZONTAL PLANE

FIELD

This invention relates to light control films and optical systems that include the same. Such light control films and optical systems may be used, for example, in automotive displays.

BACKGROUND

Optical systems are widely used for lap-top computers, hand-held calculators, digital watches, automotive touch-screen displays, and the like. The familiar liquid crystal display (LCD) is a common example of such an optical system. In the LCD display, portions of the liquid crystal have their optical state altered by the application of an electric field. This process generates the contrast necessary to display pixels of information. In some examples, the LCD displays may include combinations of various light control films (LCFs) to modify the light properties of the optical system, including, for example, brightness or light output distributions.

SUMMARY

The described LCFs and optical systems including a turning film and a lenticular diffuser may be used to improve control of LCD display output distribution and enhance display brightness.

In some examples, the disclosure describes an optical system, including a backlight light guide, where the backlight light guide outputs substantially collimated light; a turning film, including a first substantially smooth surface substantially perpendicular to a display axis; and a first structured surface comprising a plurality of first microstructures defining a first plurality of substantially parallel grooves, where the turning film is adjacent to the backlight light guide, where the turning film outputs light substantially collimated in a first plane; and a lenticular diffuser, including a second substantially smooth surface substantially perpendicular to the display axis; and a second structured surface including a plurality of second microstructures defining a second plurality of substantially parallel grooves extending along a plane substantially perpendicular to the display axis, where the lenticular diffuser is optically coupled to the turning film, where the lenticular diffuser reflects or refracts collimated light toward a second plane substantially perpendicular to the first plane; where the first plurality of substantially parallel grooves is substantially perpendicular to the second plurality of substantially parallel grooves.

In some examples, the disclosure describes an optical system, including a turning film, including a first substantially smooth surface, where the first substantially smooth surface defines a display axis extending perpendicular to the first substantially smooth surface; and a first structured surface comprising a plurality of two-sided, straight-facet prisms or a plurality of multifaceted prisms including a first material having a first refractive index, where the plurality of two-sided, straight-facet prisms or the plurality of multifaceted prisms define a first plurality of substantially parallel grooves on the first structured surface extending substantially perpendicular to the display axis; and a second material having a second refractive index, where the second material is adjacent the plurality of two-sided, straight-facet prisms or the plurality of multifaceted prism, where the first refractive index is greater than the second refractive index; and a lenticular diffuser, including a second substantially smooth surface, where the second substantially smooth surface is substantially perpendicular to the display axis; and a second structured surface, where the second structured surface includes a plurality of second microstructures each comprising an arcuate prism including a third material having a third refractive index, where a cross section of each arcuate prism extends along a plane substantially parallel to the display axis in a direction from the second substantially smooth surface to a vertex, where the plurality of second microstructures define a second plurality of substantially parallel grooves on the second structured surface extending along a plane substantially perpendicular to the display axis; and a fourth material having a fourth refractive index, where the fourth material is adjacent the plurality of second microstructures, where the difference between the third refractive index and the fourth refractive index is between about 0.1 and about 0.3, where the lenticular diffuser is optically coupled to the turning film; where the first plurality of grooves is substantially orthogonal to the second plurality of grooves, where the lenticular diffuser is configured to provide greater than ±40 degrees half width at half maximum (HWHM) luminance from an input beam less than ±20 degrees HWHM.

In some examples, the disclosure describes an optical system, including a turning film, including a first substantially smooth surface, where the first substantially smooth surface defines a display axis extending perpendicular to the first substantially smooth surface; and a first structured surface including a plurality of two-sided, straight-facet prisms or a plurality of multifaceted prisms including a first material having a first refractive index, where the plurality of two-sided, straight-facet prisms or the plurality of multifaceted prisms define a first plurality of substantially parallel grooves on the first structured surface extending substantially perpendicular to the display axis; and a second material having a second refractive index, where the second material is air, where the second material is adjacent the plurality of two-sided, straight-facet prisms or the plurality of multifaceted prism, where the first refractive index is greater than the second refractive index; and a lenticular diffuser, including a second substantially smooth surface, where the second substantially smooth surface is substantially perpendicular to the display axis; and a second structured surface, where the second structured surface includes a plurality of second microstructures each including an arcuate prism including a third material having a third refractive index, where a cross section of each arcuate prism extends along a plane substantially parallel to the display axis in a direction from the second substantially smooth surface to a vertex, where the plurality of second microstructures define a second plurality of substantially parallel grooves on the second structured surface extending along a plane substantially perpendicular to the display axis; and a fourth material having a fourth refractive index, where the fourth material is adjacent the plurality of second microstructures, where the difference between the third refractive index and the fourth refractive index is between about 0.1 and about 0.3, where the lenticular diffuser is optically coupled to the turning film; where the first plurality of grooves is substantially orthogonal to the second plurality of grooves, where the first substantially smooth surface is adjacent the second substantially smooth surface, where the lenticular diffuser is configured to provide greater than ±50 degrees half width at half maximum (HWHM) luminance from an input beam less than ±20 degrees HWHM.

In some examples, the disclosure describes an optical system, including a liquid crystal display, a backlight light guide, a light control film disposed between the backlight light guide and the liquid crystal display, the light control film including a turning film, including a first substantially smooth surface substantially perpendicular to a display axis; and a first structured surface including a plurality of first microstructures defining a first plurality of substantially parallel grooves, where the turning film outputs light substantially collimated in a first plane; and a lenticular diffuser, including a second substantially smooth surface substantially perpendicular to the display axis; and a second structured surface including a plurality of second microstructures each including a hybrid lenticular prism, where a cross section of each hybrid lenticular prism extends along a plane substantially parallel to the display axis in a direction from the second substantially smooth surface to a vertex, where the plurality of second microstructures defines a second plurality of substantially parallel grooves on the second structured surface extending along a plane substantially perpendicular to the display axis; and a first material having a first refractive index, where the first material forms the plurality of second microstructures, where the lenticular diffuser is optically coupled to the turning film; where the first plurality of substantially parallel grooves is substantially perpendicular to the second plurality of substantially parallel grooves.

In some examples, the disclosure describes an optical system mounted in a vehicle, including a vehicle; and a display system mounted in the vehicle, the display system including a backlight light guide, a turning film, including a first substantially smooth surface substantially perpendicular to a display axis; and a first structured surface including a plurality of first microstructures defining a first plurality of substantially parallel grooves, where the turning film is adjacent to the backlight light guide, where the turning film outputs light substantially collimated in a first plane; and a lenticular diffuser, including a second substantially smooth surface substantially perpendicular to the display axis; and a second structured surface including a plurality of second microstructures each including a hybrid lenticular prism, where a cross section of each hybrid lenticular prism extends along a plane substantially parallel to the display axis in a direction from the second substantially smooth surface to a vertex, where the plurality of second microstructures defines a second plurality of substantially parallel grooves on the second structured surface extending along a plane substantially perpendicular to the display axis; and a first material having a first refractive index, where the first material forms the plurality of second microstructures, where the lenticular diffuser is optically coupled to the turning film; and a liquid crystal display optically coupled to the lenticular diffuser, where the first plurality of substantially parallel grooves is substantially perpendicular to the second plurality of substantially parallel grooves.

In some examples, the disclosure describes an optical system, comprising (a) a turning film, (b) a lenticular diffuser. The turning film comprises a first substantially smooth surface substantially perpendicular to a display axis, and a first structured surface comprising a plurality of first microstructures defining a first plurality of substantially parallel grooves, wherein the turning film outputs light substantially collimated in a first plane. The lenticular diffuser comprises a second substantially smooth surface substantially perpendicular to the display axis, and a second structured surface comprising a plurality of lenticular prisms defining a second plurality of substantially parallel grooves extending along a plane substantially perpendicular the display axis, wherein the second structured surface comprising a plurality of lenticular prisms comprises a plurality of two-sided substantially straight-facet prisms having rounded tips separated by a substantially flat land area, wherein a cross section of each lenticular prism extends along a plane substantially parallel to the display axis in a direction from the second substantially smooth surface to a vertex, and wherein the lenticular diffuser is optically coupled to the turning film, and wherein the lenticular diffuser reflects or refracts light substantially collimated in the first plane toward a second plane substantially perpendicular to the first plane. The first plurality of substantially parallel grooves is substantially perpendicular to the second plurality of substantially parallel grooves.

BRIEF DESCRIPTION OF DRAWINGS

The foregoing and other aspects of this invention are made more evident in the following Detailed Description, when read in conjunction with the attached Figures.

FIG. 1A is a conceptual and schematic lateral cross-sectional view of an example optical system.

FIG. 3 is a conceptual and schematic lateral cross-sectional view of an example optical system.

It should be understood that the subject matter of certain Figures of this disclosure may not necessarily be drawn to scale, and that the Figures present non-exclusive examples of the light control films and optical systems disclosed herein.

DETAILED DESCRIPTION

The disclosure describes light control films (LCFs) and optical systems that include the same. An optical system, such as a display assembly, may be more bright at an on-axis position (i.e., the direction of the display normal) and less bright at off-axis positions (e.g., a direction at some angle greater than zero relative to the display normal). In some optical system applications, it may be desirable to control the horizontal light output distribution and reduce off-axis illumination in the vertical direction to provide a display that is as bright or nearly as bright to viewers at an on-axis position and a range of off-axis positions in the horizontal direction with low off-axis light in the vertical direction. For example, it may be desirable to control the horizontal light output distribution in automotive display applications where an instrument display may be in front of the driver (e.g., on-axis with respect to a driver and off-axis with respect to a front seat passenger) or a console display midway between the driver and the front seat passenger (e.g., off-axis with respect to both driver and front seat passenger) to provide a display that is as bright or nearly as bright to the driver and the front seat passenger and reduces off-axis light in the vertical direction.

In some optical system applications, LCFs may be used to control the light output distribution. The described LCFs and optical systems may include a turning film (e.g., prism-like turning structures) and a lenticular diffuser (e.g., curved diffusing structures) to regulate optical output distributions and enhance brightness characteristics. For example, the described LCFs may spread the output distribution in the horizontal direction to enhance display brightness characteristics in on-axis positions and off-axis positions. As compared to LCFs without a turning film and lenticular diffuser, the disclosed LCFs with a turning film and lenticular diffuser may improve control of the display output distribution and enhance display brightness in the horizontal direction while reducing off-axis light in the vertical direction. Thus, the disclosure provides example LCFs and optical systems having horizontal output distributions that enhance display brightness in the horizontal direction, and reduce off-axis light in the vertical direction, relative to the display surface.

Figure 1B:
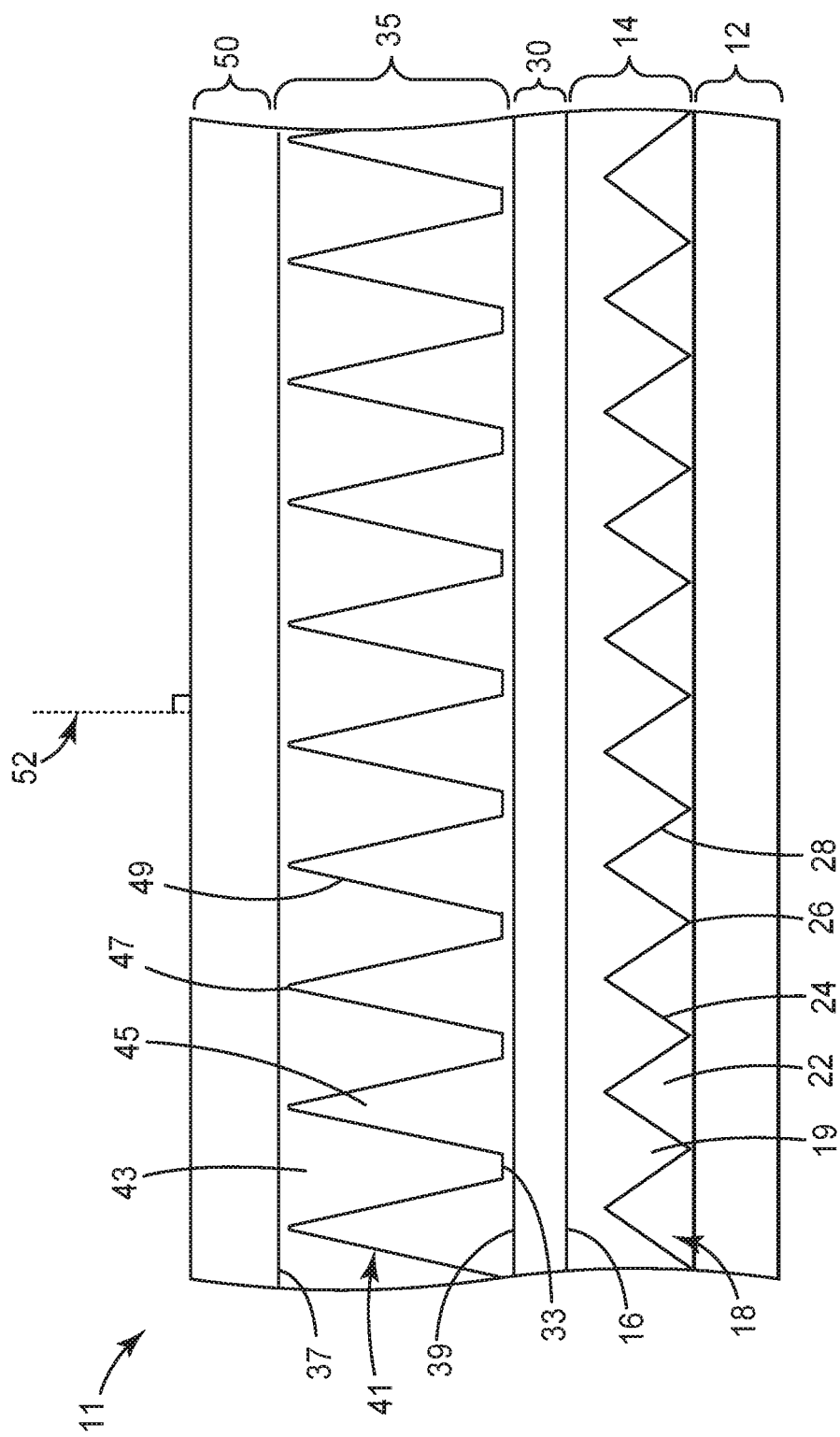
FIG. 1B is a conceptual and schematic lateral cross-sectional view of an example optical system.

The turning films and lenticular diffusers described herein each may include a plurality of microstructures (e.g., prisms). In some examples, the plurality of microstructures of the turning film may include at least two faces that are configured to collimate, refract, and/or reflect light. In some examples, the plurality of microstructures of the lenticular diffuser may include continuous, curved-faced prisms that are configured to reflect and/or refract light. For example, FIG. 1A is a conceptual and schematic lateral cross-sectional view of an example optical system 10. In the example of FIG. 1A, optical system 10 may include backlight light guide 12, turning film 14, substrate 30, lenticular diffuser 34, and liquid crystal display (LCD) 50. In some examples, a LCF of optical system 10 may include turning film 14 and lenticular diffuser 34. In some examples, the plurality of microstructures of the lenticular diffuser may include continuous, straight-faced prisms having rounded tips. For example, FIG. 1B is a conceptual and schematic lateral cross-sectional view of an example optical system 11. In the example of FIG. 1B, optical system 11 may include backlight light guide 12, turning film 14, substrate 30, lenticular diffuser 35, and LCD 50. In some examples, a LCF of optical system 11 may include turning film 14 and lenticular diffuser 35.

For illustration purposes, FIGS. 1A and 1B show microstructures of turning film 14, as well as for lenticular diffuser 34, 35. In practice, however, a cross-sectional view of optical system 10, 11 would typically show the microstructures of only turning film 14 or only lenticular diffuser 34, 35 because the grooves in turning film 14 are typically substantially perpendicular to the grooves in lenticular diffuser 34, 35. In some examples, lenticular diffuser 34, 35 may be configured to receive light from turning film 14 collimated in a first plane (e.g., light ray 56) and preferentially reflect and/or refract the collimated light toward a second plane orthogonal to the first plane (e.g., light ray 58). For example, lenticular diffuser 34, 35 may receive the collimated light output from a turning film type lightguide, or a wedge or pseudo-wedge lightguide, or the like. In some examples, lenticular diffuser 34, 35 may be configured to spread the collimated light from turning film 14 in a plane horizontal to a display surface. For example, the described LCF including turning film 14 and lenticular diffuser 34, 35 may have features that operate by refracting and/or reflecting light.

In some examples, lenticular diffuser 34 may define substantially smooth surface 38 (e.g., non-structured) and structured surface 40. In some examples, structured surface 40 may include a plurality of microstructures 44 each having curved face 48 having a vertex 46. In some examples, microstructures 44 may define grooves 42 having a valley 43. In some examples, lenticular diffuser 34 may be optically coupled to turning film 14 (i.e., no air or other significant gap between lenticular diffuser 34 and turning film 14 that may allow for significant reflection of the surface of adjacent layers).

In some examples, lenticular diffuser 35 may define substantially smooth surface 39 (e.g., non-structured) and structured surface 41. In some examples, structured surface 41 may include a plurality of microstructures 45 each having straight face 49 and rounded tip 47. In some examples, microstructures 45 may define grooves 43 having a substantially flat land area 33. In some examples, microstructures 45 may be optically coupled to turning film 14 (i.e., no air or other significant gap between lenticular diffuser 35 and turning film 14 that may allow for significant reflection of the surface of adjacent layers).

In some examples, substantially smooth surface 38 may define display axis 52 extending substantially perpendicular to substantially smooth surface 38. In some examples, substantially smooth surface 38 need not be completely smooth, and may qualify as a substantially smooth surface if the surface does not contain microstructures (e.g., non-structured surface). For example, an anti-wetout or anti-glare beaded coating may be included or incorporated on the surface of substantially smooth surface 38, and such a surface may still be considered substantially smooth. In other words, the term smooth is not used in the sense that the surface is non-rough or perfectly planar, but instead is used to indicate that the surface is non-structured.

In some examples, structured surface 40, 41 may include prismatic microstructures 44, 45 e.g., multifaceted prisms. In other examples, structured surface 40, 41 may include more than one microstructures 44, 45, e.g., a curved-faced or straight-faced microstructure, an arcuate microstructure, an angular microstructure, and/or multifaceted microstructure. In some examples, each of microstructures 44, 45 may be linear microstructures, i.e., microstructures 44, 45 may extend along a plane perpendicular to display axis 52 with substantially the same (e.g., the same or nearly the same) cross-sectional shape (e.g., as shown in the cross-sectional view of FIGS. 1A and 1B, and extending along a plane into/out of the page). In other examples, microstructures 44, 45 may be linear microstructures extending along a plane parallel to the page (not shown in FIGS. 1A and 1B).

In some examples, each of microstructures 44 may be a prism with curved face 48. In some examples, curved face 48 may be configured to preferentially reflect and/or refract light in the horizontal direction, e.g., toward a plane substantially perpendicular to the display axis. For example, curved face 48 may be a continuous curved shape, an arcuate shape, a conic section, a lenticular shape (e.g., biconvex), a polynomial shape, a free-form optic, or the like. In some examples, curved face 48 may be shaped with control parameters to cover the space of desired width and uniformity of output light distributions. In some examples, the cross section of each microstructures 44 may extend substantially parallel to the display axis from substantially smooth surface 38 to vertex 46. In some examples, microstructures 44 may be prisms with a cross section shaped to refract light. In some examples, microstructures 44 may be prisms with a cross section shaped to refract light and reflect light. In other examples, microstructures 44 may be prisms with a hybrid lenticular shaped cross section to refract light and reflect light by total internal reflection.

In some examples, each of microstructures 45 may be a prism with straight face 49 and rounded tip 47. In some examples, microstructures 45 may have flat land area 33 between prisms. In some examples, microstructures 45 may be configured to preferentially reflect and/or refract light in the horizontal direction, e.g., toward a plane substantially perpendicular to the display axis. In some examples, microstructures 45 may be shaped with control parameters to cover the space of desired width and uniformity of output light distributions. In some examples, the cross section of each microstructures 45 may extend substantially parallel to the display axis from substantially smooth surface 39 to rounded tip 47. In some examples, microstructures 45 may be prisms with a hybrid lenticular shaped cross section to refract light and reflect light by total internal reflection.

Lenticular diffuser 34, 35 may be any suitable thickness and may be made from any suitable material. In some examples, microstructures 44, 45 of lenticular diffuser 34, 35 will be formed from a polymeric material, such as polycarbonate, polyethylene terephthalate, polyethylene naphthalate, poly (methyl methacrylate) and copolymers and blends of the same. Other appropriate materials include acrylics, polystyrenes, methyl styrenes, acrylates, polypropylenes, polyvinyl chlorides, and the like. In some examples, lenticular diffuser 34, 35 may be optically transparent or have low haze and high clarity to avoid undesirably scattering incident light. In some examples, the material forming microstructures 44, 45 of lenticular diffuser 34, 35 may have a sufficiently high index of refraction, such as about 1.45 to about 1.75, to facilitate reflection and/or refraction over a sufficiently broad range of angles. In some examples, to achieve a desired high refractive index, particularly suitable materials are UV-curable composites containing Zr particles, as described in U.S. Pat. No. 7,833,662. In some examples the material, dimensions, or both of lenticular diffuser 34, 35 may be selected to produce a flexible film.

Microstructures 44, 45 may be any appropriate size. The pitch of microstructures 44 may be measured from the valley of two consecutive grooves 42. The overall arrangement of microstructures 44 on smooth surface 38 may have any suitable pitch and may or may not have land (flat areas; not shown) between adjacent microstructures. When a flat land 33 is included between adjacent microstructures, the pitch of microstructures 45 may be measured from the endpoint of flat land 33 of two consecutive grooves 43. The overall arrangement of microstructures 45 on smooth surface 39 may have any suitable pitch between adjacent microstructures. In some examples, microstructures 44, 45 may be on the millimeter or micrometer scale, for example, pitch of microstructures 44, 45 may be between about 15 micrometers and 200 micrometers. The pitch or size of microstructures 44, 45 may increase, decrease, both increase and decrease, or remain constant for all or portions of structured surface 40, 41 of lenticular diffuser 34, 35. In some examples, microstructures 44, 45 may all be substantially the same (e.g., the same or nearly the same) or may include a combination of microstructures that are different shapes or sizes.

Microstructures 44, 45, and more generally, the structured surface 40, 41 may be formed through any suitable process, such as a microreplication process. For example, smooth surface 38, 39 may be formed through cutting (fly cutting, thread cutting, diamond turning, or the like), or pressing a compliant but curable or hardenable material against a suitable tool with a surface defining the negative of the desired structure. For example, microstructures 44, 45 may be formed with a prism design tool that may include, for example, the following parameters: pitch (p), sidewall base angles ($\alpha_1$ and $\alpha_2$), sidewall radius of curvature, tip radius ($R_{tip}$), valley radius, flat land width (w), fill fraction (p−w)/p, aspect ratio (h/(p−w)), and/or the tip fraction ($R_{tip}$/p). In some examples, the fill fraction is about 0.6 to about 0.95, or about 0.8 to about 0.9. In some examples, $\alpha_1$ and $\alpha_2$ are about 75 degrees to about 80 degrees, or about 77 degrees to about 79 degrees. In some examples, for any combination of sidewall base angles, tip radius and other fabrication variations, the fill fraction can be adjusted to compensate for modulation (lack of flatness) in the luminance profile. In some examples, $R_{tip}$ is about 2 am or less, or about 1 am or less. In some examples, the tip fraction is less than about 0.1 or less than about 0.035. In some examples, the aspect ratio is about 1.8 to about 2.5.

In some examples, prism design tool parameters may be varied to provide a structured surface 40, 41 with desired light output distribution, e.g., a suitably wide and smooth output light distribution. In some examples, the microstructure forming process may be automated with a multi-parameter search and an optimization metric such as, for example, establishing a full-width, half maximum or a half-width, half maximum and varying the second derivative of luminance versus polar view angle to achieve a desired light output distribution. Other processes for forming lenticular diffuser 34, 35 may also be possible including, for example, casting and curing with an electroplated, laser cut, or etched tool, using photolithography such as two-photon mastering of a tool in conjunction with a cast and cure process, or even direct machining or an additive three-dimensional printing process. The material may be subsequently hardened or cured (e.g., through exposure to light such as ultraviolet light), leaving structured surface 40, 41 with the desired microstructures 44, 45.

In some examples, structured surface 40, 41 may define a plurality of substantially parallel grooves 42, 43. In some examples, each of grooves 42, 43 may be linear grooves, i.e., grooves 42, 43 may extend along a plane that is substantially perpendicular to display axis 52 with substantially the same (e.g., the same or nearly the same) cross-sectional shape (e.g., as shown in the cross-sectional view of FIGS. 1A and 1B, and extending along a plane into/out of the page). In other examples, grooves 42, 43 may be linear grooves extending along a plane parallel to the page (not shown in FIGS. 1A and 1B). In some examples, grooves 42, 43 may be any suitable thickness.

In some examples, grooves 42,43 may be totally filled with material such that lenticular diffuser 34, 35 may include substantially smooth surface 36, 37. In some examples, grooves 42, 43 may be filled partially with material such that the material in grooves 42, 43 is adjacent to at least a portion of structured surface 40, 41. In some examples, the material in grooves 42, 43 may be any suitable material. For example, the material in grooves 42, 43 may be a low refractive index material, air, an optical adhesive, silicones, fluorinated polymers and copolymers, nano-void air entrained ultra-low index material, or the like. In other examples, the material in grooves 42, 43 may include more than one material, e.g., air and an optical adhesive, or the like.

In some examples, the material in grooves 42, 43 may have a refractive index less than the refractive index of the material of microstructures 44, 45. In some examples, the material filling grooves 42, 43 may have a sufficiently low index of refraction, such as between about 1.3 and about 1.55, to facilitate total internal reflection over a sufficiently broad range of angles. In some examples, the difference between the refractive index of the material forming microstructures 44, 45 and the refractive index of the material filling grooves 42, 43 may be between 0.05 and 0.6, or between about 0.1 and 0.3, or between about 0.15 and 0.25.

The horizontal output distribution of optical system 10, 11 may be described as luminance as a function of as view angle. Luminance as a function of as view angle may be described as having a half width at half maximum (HWHM), i.e., the view angle position on either side of the on-axis position at which the luminance is one-half of the maximum luminance (e.g., luminance at the on-axis position). In some examples, lenticular diffuser 34, 35 may be configured to provide a greater than about ±40 degrees HWHM from an input light beam less than about ±30 degrees HWHM. For example, the shape, size, and pitch of microstructures 44, 45 may be selected to provide a greater than about ±40 degrees HWHM from an input light beam less than about ±30 degrees HWHM. In other examples, lenticular diffuser 34, 35 may be configured to provide a greater than about ±50 degrees HWHM from an input light beam less than about ±20 degrees HWHM. For example, the shape, size, and pitch of microstructures 44, 45 may be selected to provide a greater than about ±50 degrees HWHM from an input light beam less than about ±20 degrees HWHM.

Luminance as a function of as view angle may also be described as having a half width at 80% maximum (HW80), i.e., the view angle position on either side of the on-axis position at which the luminance is 80% of the maximum luminance (e.g., luminance at the on-axis position). In some examples, lenticular diffuser 34, 35 may be configured to provide a greater than about ±35 degrees HW80 from an input light beam less than about ±30 degrees HWHM. For example, the shape, size, and pitch of microstructures 44, 45 may be selected to provide a greater than about ±35 degrees HW80 from an input light beam less than about ±30 degrees HWHM. In other examples, lenticular diffuser 34, 35 may be configured to provide a greater than about ±40 degrees HW80 from an input light beam less than about ±20 degrees HWHM. For example, the shape, size, and pitch of microstructures 44, 45 may be selected to provide a greater than about ±40 degrees HW80 from an input light beam less than about ±20 degrees HWHM In some examples, turning film 14 may include substantially smooth surface 16 (e.g., non-structured) and structured surface 18. In some examples, substantially smooth surface 18 may define display axis 52 extending substantially perpendicular to substantially smooth surface 16. In some examples, structured surface 18 may include a plurality of microstructures 19 each having first side 24 and second side 28 that intersect at vertex 26. In other examples, structured surface 18 may include more than two surfaces, e.g., a multifaceted microstructure. In some examples, microstructures 19 of structured surface 18 may define grooves 22. In some examples, grooves 22 may be substantially parallel. In some examples, turning film 14 may be optically coupled to backlight light guide 12. In some examples, turning film 14 may output light substantially collimated in a first plane.

In some examples, turning film 14 may be configured to receive substantially collimated light from backlight light guide 12 (e.g., light ray 54) and output light substantially collimated in a first plane (e.g., light ray 56). For example, turning film 14 may receive the substantially collimated light output from a turning film type lightguide, or a wedge or pseudo-wedge lightguide, or the like.

In some examples, substantially smooth surface 16 need not be completely smooth in all embodiments, and may qualify as a substantially smooth surface as long as the surface does not contain microstructures (e.g., non-structured surface). For example, an anti-wetout or anti-glare beaded coating may be included or incorporated on the surface of substantially smooth surface 16, and such a surface may still be considered substantially smooth. In other words, the term smooth is not used in the sense that the surface is non-rough or perfectly planar, but instead is used to indicate that the surface is non-structured.

In some examples, structured surface 18 may include prismatic microstructures 19. In other examples, structured surface 18 may include more than one microstructure 19, e.g., an angular microstructure, a multifaceted microstructure, or the like. In some examples, each of microstructures 19 may be linear microstructures, i.e., microstructures 19 may extend along a plane perpendicular to display axis 52 with substantially the same (e.g., the same or nearly the same) cross-sectional shape (e.g., as shown in the cross-sectional view of FIGS. 1A and 1B, and extending in an axis into/out of the page). In other examples, microstructures 44 may be linear microstructures extending in a plane parallel to the page (not shown in FIGS. 1A and 1B).

In some examples, each of microstructures 19 may have a first side 24 and a second side 28. In some examples, first side 24 and second side 28 may be similar. For example, each of first side 24 and second side 28 may have a single, straight facet, curved facet or the like. In other examples, first side 24 and second side 28 may be dissimilar. For example, each of first side 24 and second side 28 may have a different number of facets, or may be multifaceted, or the like. In other examples, first side 24 or second side 28 may be curved or arcuate to form a suitable light output distribution from the substantially collimated input distribution. In that sense, first side 24 may preferentially reflect light in a first direction and second side 28 may preferentially reflect light in a second direction. The overall arrangement of microstructures 19 on structured surface 18 may have any suitable pitch and may or may not have land (flat areas; not shown) between adjacent microstructures. In some examples, microstructures 18 may be directly adjacent to one another such that a microstructure creates a shadowing effect on an adjacent microstructure.

Microstructures 19 may be any appropriate size. In some examples, microstructures 19 may be on the millimeter or micrometer scale, e.g., pitch of microstructures 19 between about 10 and about 200 micrometers or between about 10 and about 100 micrometers. The pitch or size of asymmetric microstructures 19 may increase, decrease, both increase and decrease, or remain constant for all or portions of structured surface 18 of turning film 14. In some examples, microstructures 19 may all be substantially the same (e.g., the same or nearly the same) or may include a combination of microstructures that are different shapes or sizes.

Turning film 14 may be any suitable thickness and may be made from any suitable material. In some examples, microstructures 19 of turning film 14 may be formed from a polymeric material, such as polycarbonate, polyethylene terephthalate, polyethylene naphthalate, poly (methyl methacrylate) and copolymers and blends of the same. Other appropriate materials include acrylics, polystyrenes, methyl styrenes, acrylates, polypropylenes, polyvinyl chlorides, and the like. In some examples, turning film 14 may be optically transparent or have low haze and high clarity to avoid undesirably scattering incident light. In some examples, the material forming microstructures 19 of turning film 14 may have a sufficiently high index of refraction, such as between about 1.5 and about 1.75, to facilitate total internal reflection at a sufficiently broad range of angles. In some examples the material, dimensions, or both of turning film 14 may be selected to produce a flexible film. In some examples, useful materials for the microstructures of turning film 14 are those described in U.S. Pat. No. 9,360,592.

Microstructures 19, and more generally, the structured surface 18 may be formed through any suitable process, such as a microreplication process. For example, structured surface 18 may be formed through cutting (fly cutting, thread cutting, diamond turning, or the like), or pressing a compliant but curable or hardenable material against a suitable tool with a surface defining the negative of the desired structure. The material may be subsequently hardened or cured (for example, through exposure to light such as ultraviolet light), leaving structured surface 18 with the desired microstructures 19. Other processes for forming turning film 14 may also be possible including, for example, casting and curing with an electroplated, laser cut, or etched tool, using photolithography such as two-photon mastering of a tool in conjunction with a cast and cure process, or even direct machining or an additive three-dimensional printing process.

In some examples, backlight light guide 12 may include one or more of any suitable light sources or combinations of light sources (not shown). In some examples, the light source may include one or more light emitting diodes (LEDs). In some examples, the light source may each include a singular light source or may include a plurality of light sources (e.g., a bank or series of light sources). In some examples, the light source may include cold cathode fluorescent lights (CCFLs) or incandescent light sources. The light sources and any corresponding injection, collimation, or other optics may be selected to provide any suitable wavelength or combination of wavelengths, polarizations, point spread distributions, and degrees of collimation.

In some examples, backlight light guide 12 may be configured to output substantially collimated light, e.g., substantially collimated light output may include a light output having a full-width half maximum (FWHM) of less than about 40 degrees. For example, backlight light guide 12 may include a turning film lightguide including a wedge lightguide to extract light by gradual frustration of total internal reflection such that light may be output from backlight light guide 12 along display axis 52 in the down-guide direction at high angles. As another example, backlight light guide 12 may include a pseudo-wedge including a flat lightguide having shallow sloped extractor shapes to weakly frustrate total internal reflection such that the extracted light may be collimated at high angles from backlight light guide 12 substantially parallel display axis 52 in the down-guide direction. In such examples, the density and area fraction of such extractors (i.e., surface area of extractors to total surface area of the backlight light guide) may be arranged to uniformly emit light and substantially extract light from the backlight light guide 14 along its length. Additionally, in such examples, backlight light guide 12 may include lenticular and/or prismatic grooves or structures on one side along the light propagation direction to scatter the propagating light, break up source image artifacts, or substantially collimate the light in the cross-guide direction (i.e., the light may be substantially collimated in both the down-guide and cross-guide directions).

In some examples, substrate 30 may be disposed between turning film 14 and lenticular diffuser 34, 35. In some examples, optical system 10 may not include substrate 30, e.g., turning film 14 may be directly adjacent and optically coupled to lenticular diffuser 34, 35. In some examples, substrate 30 may be an optical adhesive, polyethylene terephthalate, polycarbonate, or the like. In some examples, turning film 14 and lenticular diffuser 34, 35 may be disposed on and optically coupled to opposite sides of substrate 30. In other examples, turning film 14 and lenticular diffuser 34, 35 may be disposed on and optically coupled to two separate substrates, where the two substrates are laminated together or otherwise optically coupled.

In some examples, liquid crystal display (LCD) 50 may be disposed adjacent lenticular diffuser 34, 35. In some examples, LCD 50 may be disposed adjacent and optically coupled to lenticular diffuser 34, 35. In some examples, other layers (not shown) may be disposed between LCD 50 and lenticular diffuser 34, 35, each layer being optically coupled to each adjacent layer. Other layers may include, for example, an optical adhesive, polyethylene terephthalate, polycarbonate, or the like.

In some examples, optical system 10, 11 may be mounted in a vehicle. For example, a vehicle display system may include backlight light guide 12, turning film 14, lenticular diffuser 34, 35 and LCD 50. In other examples, a vehicle display system may include turning film 14 and lenticular diffuser 34, 35.

Figure 2A:
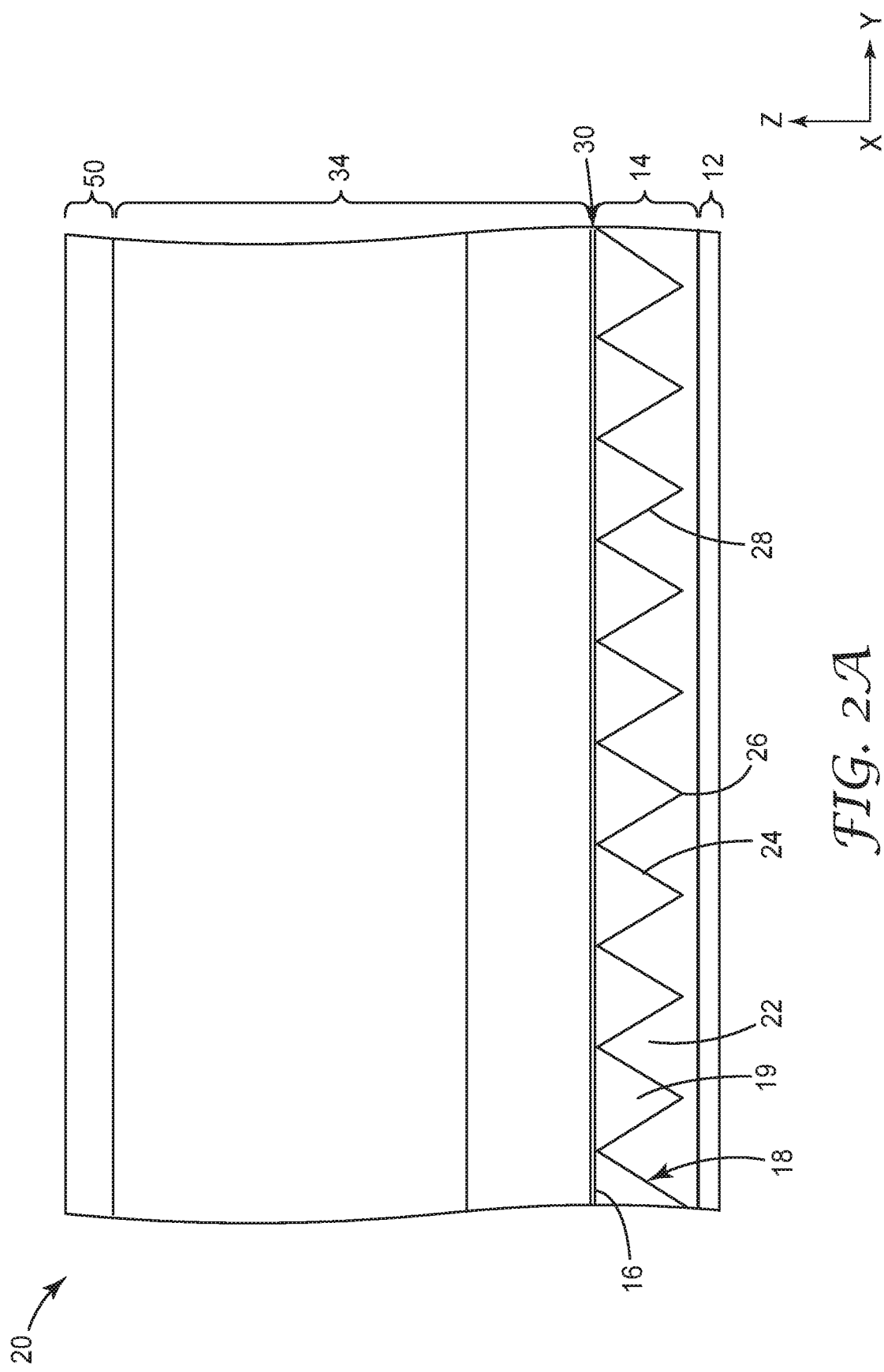
FIG. 2A is a conceptual and schematic lateral cross-sectional view of an example optical system in the YZ plane.
Figure 2B:
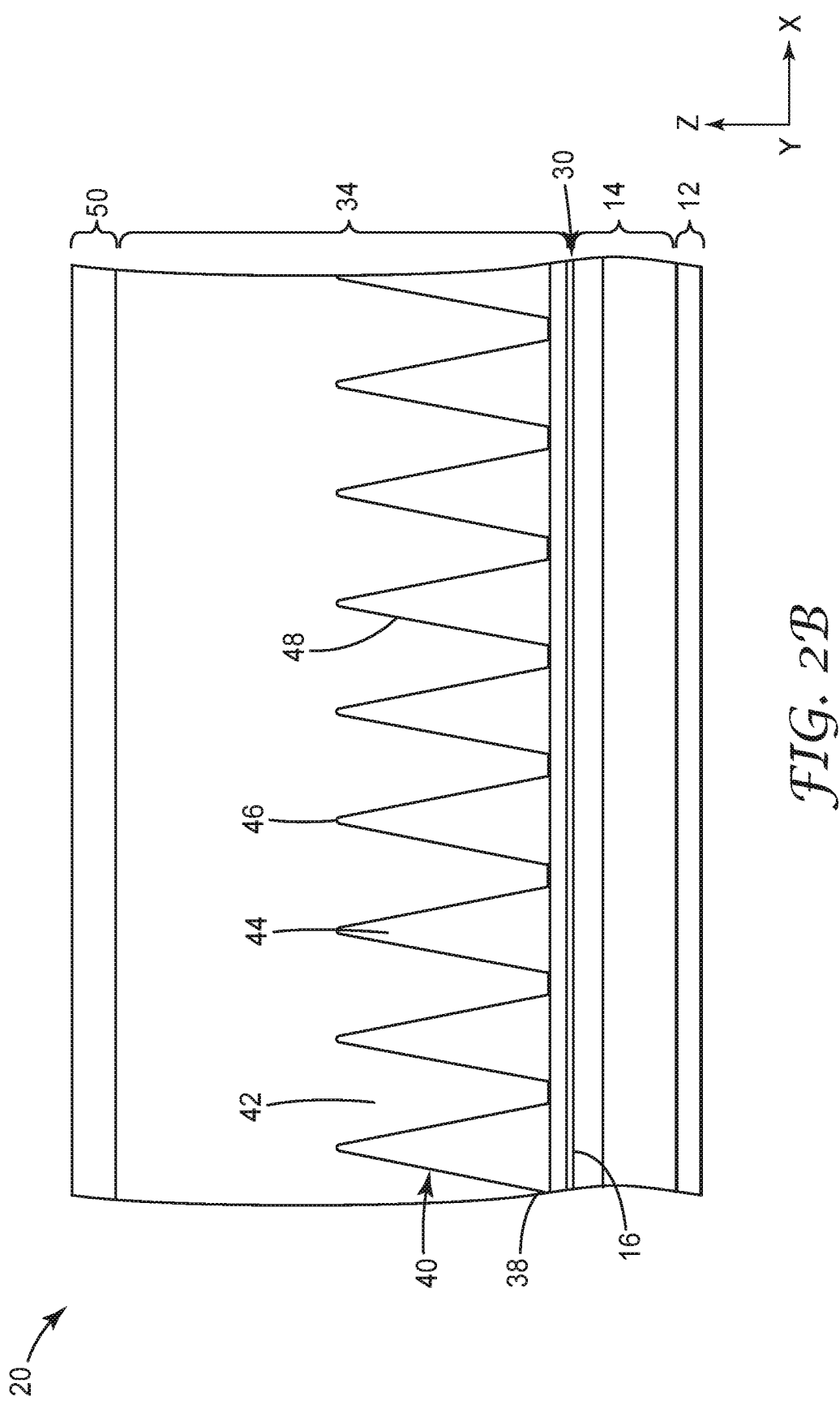
FIG. 2B is a conceptual and schematic lateral cross-sectional view of an example optical system in the XZ plane.
Figure 2C:
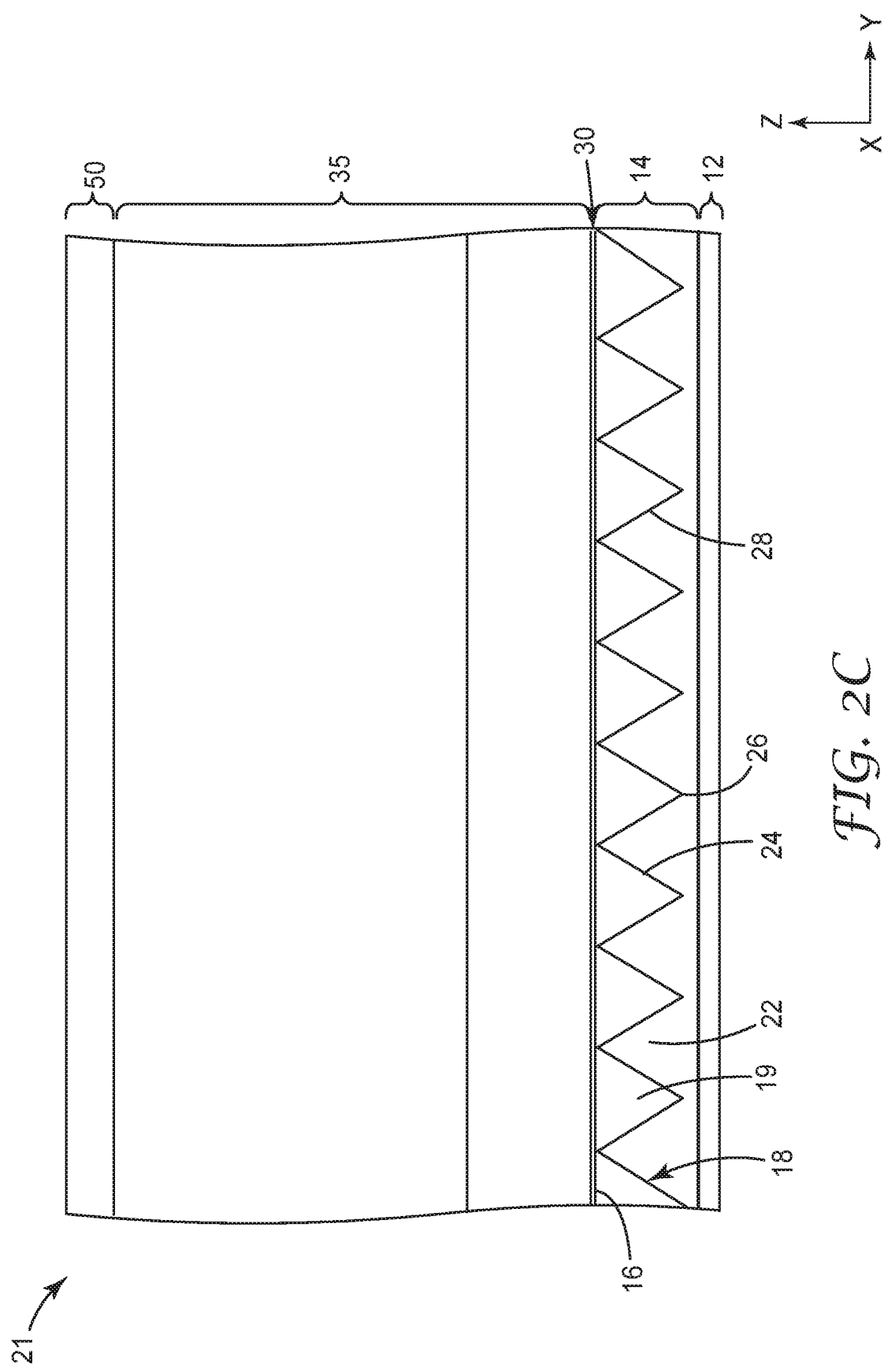
FIG. 2C is a conceptual and schematic lateral cross-sectional view of an example optical system in the YZ plane.
Figure 2D:
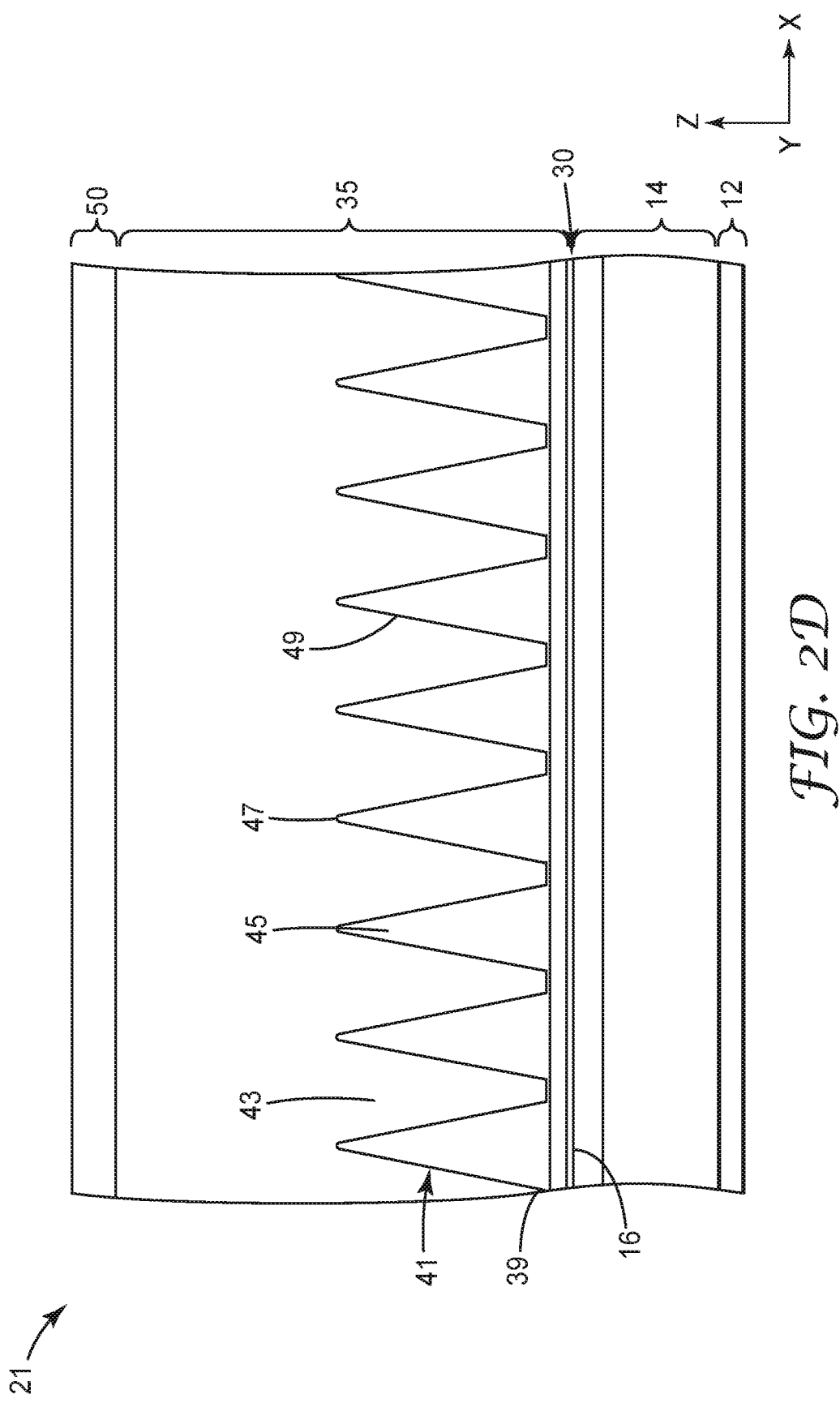
FIG. 2D is a conceptual and schematic lateral cross-sectional view of an example optical system in the XZ plane.

FIGS. 2A, 2B, 2C and 2D are conceptual and schematic lateral cross-sectional views of an example optical system 20, 21 in the YZ plane (FIGS. 2A and 2C) and the XZ plane (FIGS. 2B and 2D). Optical system 20 of FIGS. 2A and 2B may be substantially the same as optical system 10 of FIG. 1A and incorporates the description of elements above with respect to FIG. 1A. Optical system 21 of FIGS. 2B and 2C may be substantially the same as optical system 11 of FIG. 1B and incorporates the description of elements above with respect to FIG. 1B. In the examples of FIGS. 2A, 2B, 2C and 2D optical system 20, 21 may include backlight light guide 12, turning film 14, substrate 30, lenticular diffuser 34, 35 and liquid crystal display (LCD) 50.

As shown in FIGS. 2A, 2B, 2C and 2D, optical system 20, 21 may be disposed in the XY plane with the X-axis representing the horizontal axis relative to optical system 20, 21 surface, the Y-axis representing the vertical axis relative to optical system 20, 21 surface, and the Z-axis representing the display normal. As shown in FIGS. 2A and 2C, grooves 22 of turning film 14 may be disposed substantially perpendicular to the YZ plane (i.e., substantially parallel to the X-axis). As shown in FIGS. 2B and 2D, grooves 42, 43 of lenticular diffuser 34, 35 may be disposed substantially perpendicular to the XZ plane (i.e., substantially parallel to the Y-axis). In some examples, grooves 22 of turning film 14 may be substantially perpendicular to grooves 42, 43 of lenticular diffuser 34, 35.

In some examples, turning film 14 may output light collimated in the YZ plane. In some examples, lenticular diffuser 34 reflect or refract collimated light from turning film 14 away from the Z-axis toward the X-axis plane. In some examples, the position of grooves 42, 43 of lenticular diffuser 34, 35 relative to grooves 22 of turning film 14 may spread light in the horizontal direction relative to a display surface.

Example LCFs and optical systems that include the same according to the disclosure provide will be illustrated by the following non-limiting examples.

EXAMPLES

Objects and advantages of this invention are further illustrated by the following examples, but the particular materials and amounts thereof recited in these examples, as well as other conditions and details, should not be construed to unduly limit this invention.

Example 1

FIG. 3 is a conceptual and schematic lateral cross-sectional view of an example optical system 60. In the example of FIG. 3, an optical system may include optical system 60 that may include turning film 62, refractive lenticular diffuser 66, and LCD 82. Turning film 62 and LCD 82 are as described in conjunction with FIGS. 1, 2A, and 2B, and may include the features as described in FIGS. 1, 2A, and 2B.

Refractive lenticular diffuser 66 may be as described in conjunction with lenticular diffuser 34 of FIGS. 1, 2A, and 2B, and may include the features as described in FIGS. 1, 2A, and 2B, except that refractive lenticular diffuser 66 is a refractive structure, not a catadioptric structure. As shown in FIG. 3, refractive lenticular diffuser 66 may include substantially smooth surface 72, first material 78 defining microstructures 74 having an arcuate or a partial cylinder cross sectional shape, and second material 80 adjacent structured surface 70. In the example of FIG. 3, microstructures 114 were formed with prism design tools that included the following parameters: pitch, sidewall base angles, sidewall radius of curvature, tip radius, valley radius, and flat section (at the end of the structure). These parameters were varied to achieve a desired light output distribution. As shown in FIG. 3, optical system 60 may have a display axis 84 that is substantially perpendicular to the center of the display surface. In the example of FIG. 3, first material 78 had a refractive index of 1.56, second material 80 was air with a refractive index of 1.00, and substantially smooth surface 72 of lenticular diffuser 66 was adjacent substantially smooth surface 64 of turning film 62.

Figure 4:
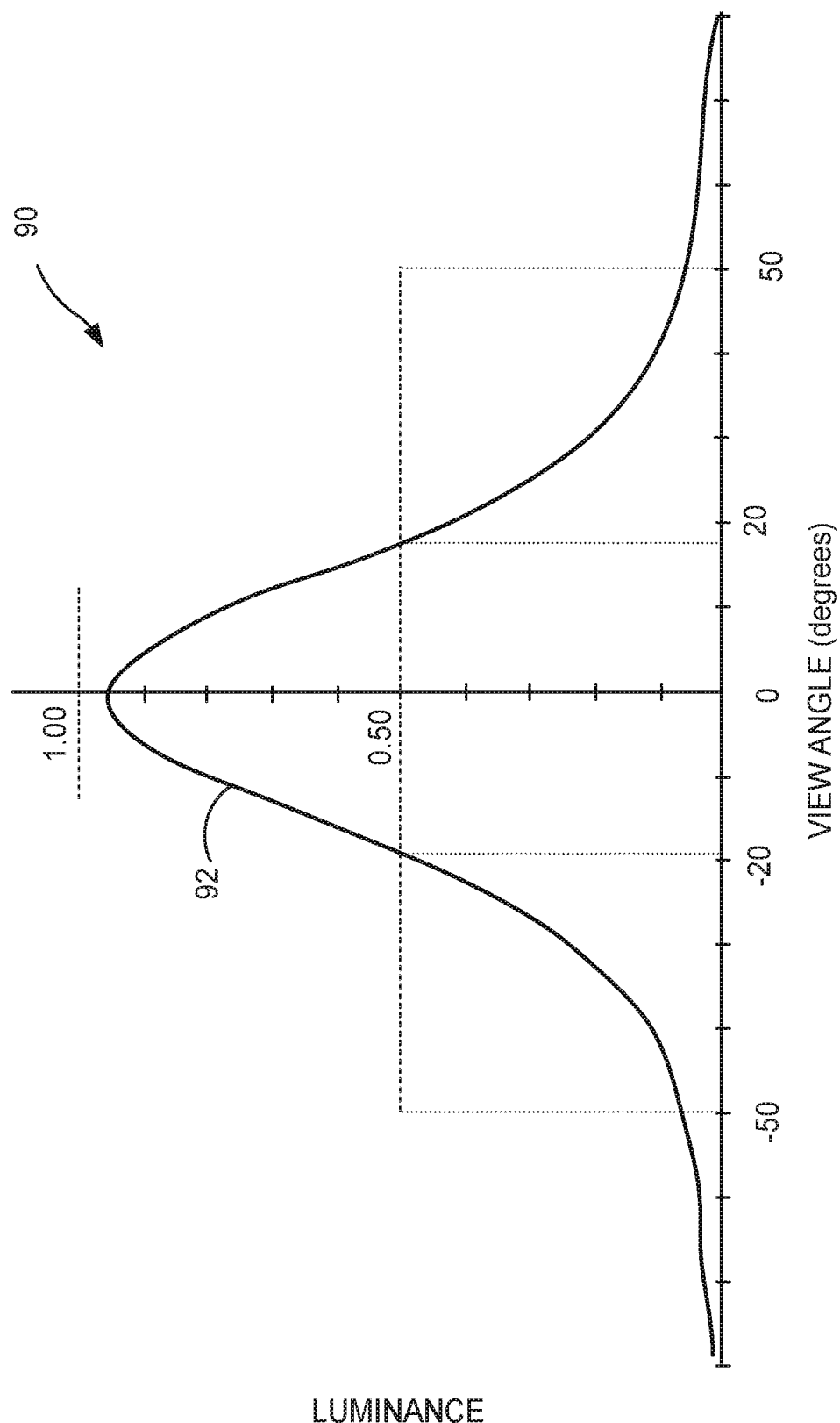
FIG. 4 is a chart presenting luminance as a function of view angle for the example optical system of FIG. 3.

FIG. 4 is a chart 90 presenting luminance as a function of view angle for the example optical system 60 of FIG. 3. The luminance was measured as a function of viewing angle from display axis 84, with zero degrees representing parallel alignment with display axis 84 (e.g., viewing display surface head-on) and ±90 degrees representing perpendicular alignment with display axis 84 (e.g., viewing the display surface from the side). Curve 92 illustrates that optical system 60 provided less than about ±20 degrees half width at half maximum (HWHM) from an input beam less than about ±20 degrees HWHM (i.e., luminance diminishes to less than half the maximum luminance at a viewing angle less than about ±20 degrees).

Example 2

Figure 5:
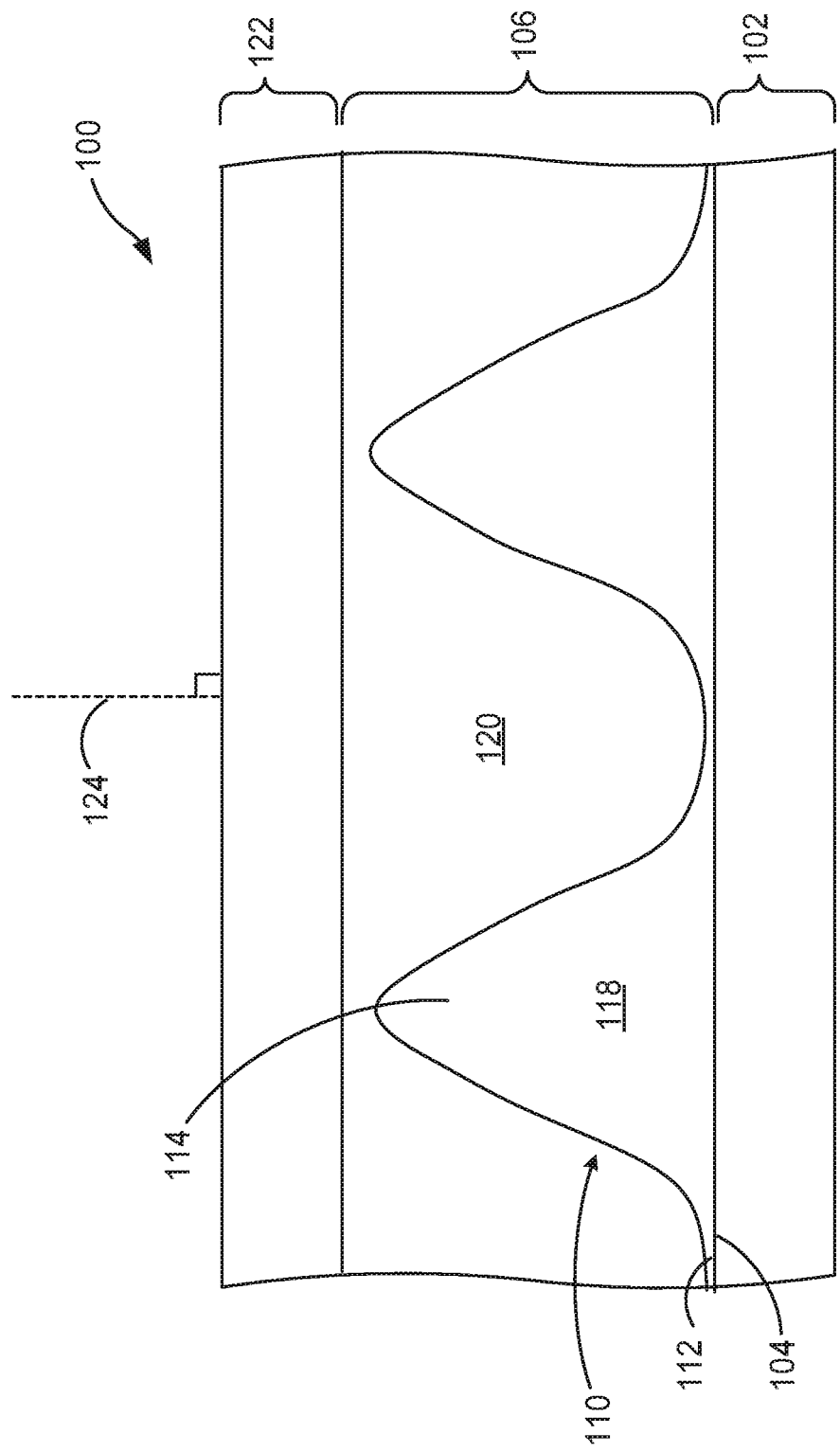
FIG. 5 is a conceptual and schematic lateral cross-sectional view of an example optical system.

FIG. 5 is a conceptual and schematic lateral cross-sectional view of an example optical system 100. In the example of FIG. 5, optical system 100 may include turning film 102, hybrid lenticular diffuser 106, and LCD 122. Turning film 102 and LCD 122 are as described in conjunction with FIGS. 1, 2A, and 2B, and may include the features as described in FIGS. 1, 2A, and 2B.

Hybrid lenticular diffuser 106 may be as described in conjunction with FIGS. 1, 2A, and 2B, and may include the features as described in FIGS. 1, 2A, and 2B. As shown in FIG. 5, hybrid lenticular diffuser 106 may include substantially smooth surface 112, first material 118 defining microstructures 114 having an arcuate cross sectional shape, and second material 120 adjacent structured surface 110. In the example of FIG. 5, microstructures 114 were formed with prism design tools that included the following parameters: pitch, sidewall base angles, sidewall radius of curvature, tip radius, valley radius, and flat section (at the end of the structure). These parameters were varied to achieve a desired light output distribution. As shown in FIG. 5, optical system 100 may have a display axis 124 that is substantially perpendicular to the center of the display surface. In the example of FIG. 5, first material 118 had a refractive index of 1.50, second material 120 was air with a refractive index of 1.00, and substantially smooth surface 112 of hybrid lenticular diffuser 106 was adjacent substantially smooth surface 104 of turning film 102.

Figure 6:
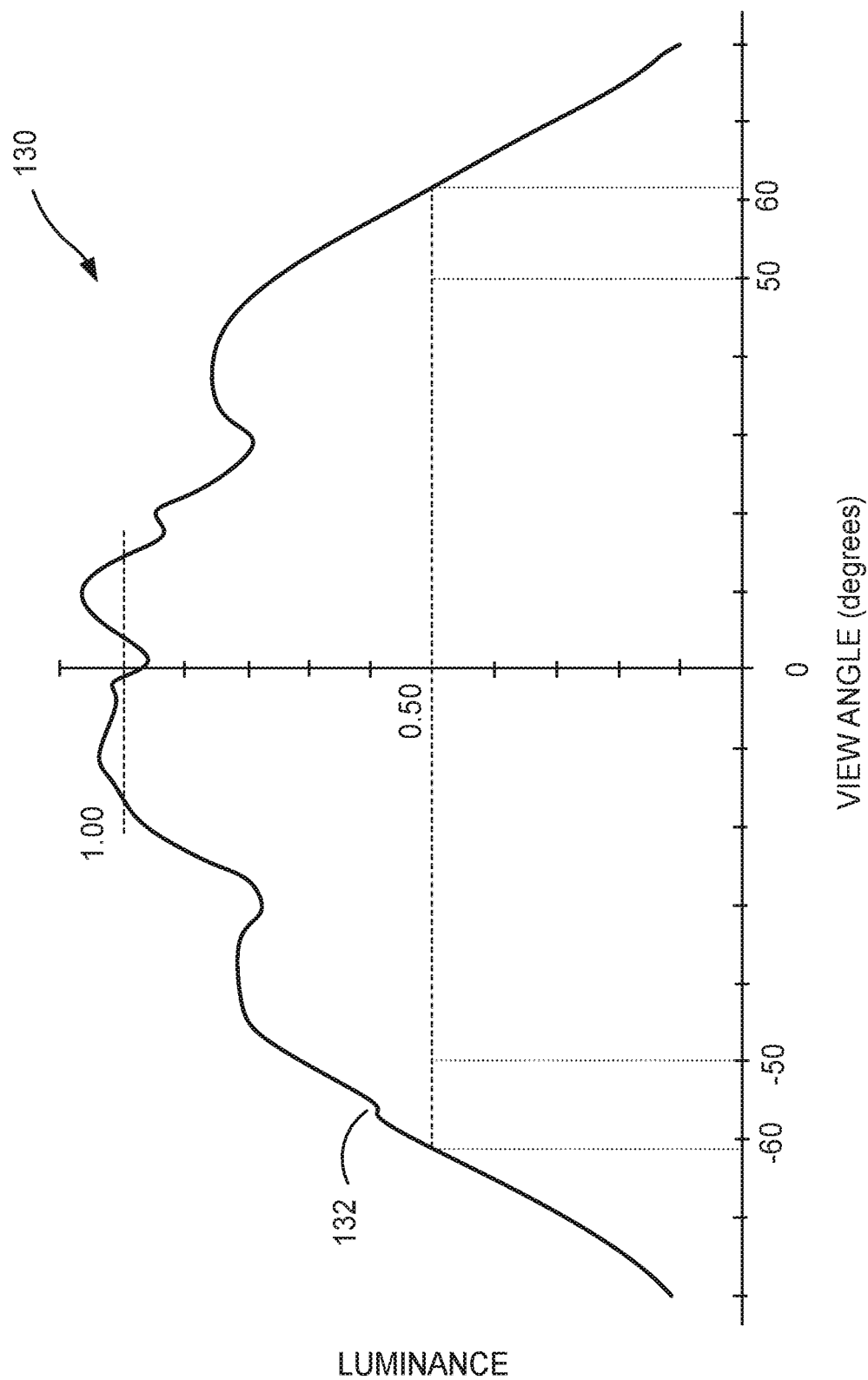
FIG. 6 is a chart presenting luminance as a function of view angle for the example optical system of FIG. 5.

FIG. 6 is a chart 130 presenting luminance as a function of view angle for the example optical system 100 of FIG. 5. The luminance was measured as a function of viewing angle from display axis 124, with zero degrees representing parallel alignment with display axis 124 (e.g., viewing display surface head-on) and ±90 degrees representing perpendicular alignment with display axis 124 (e.g., viewing the display surface from the side). Curve 132 illustrates that optical system 100 provided more than about ±60 degrees half width at half maximum (HWHM) from an input beam less than about ±20 degrees HWHM (i.e., luminance diminishes to half the maximum luminance at a viewing angle greater than about ±60 degrees).

Example 3

Figure 7:
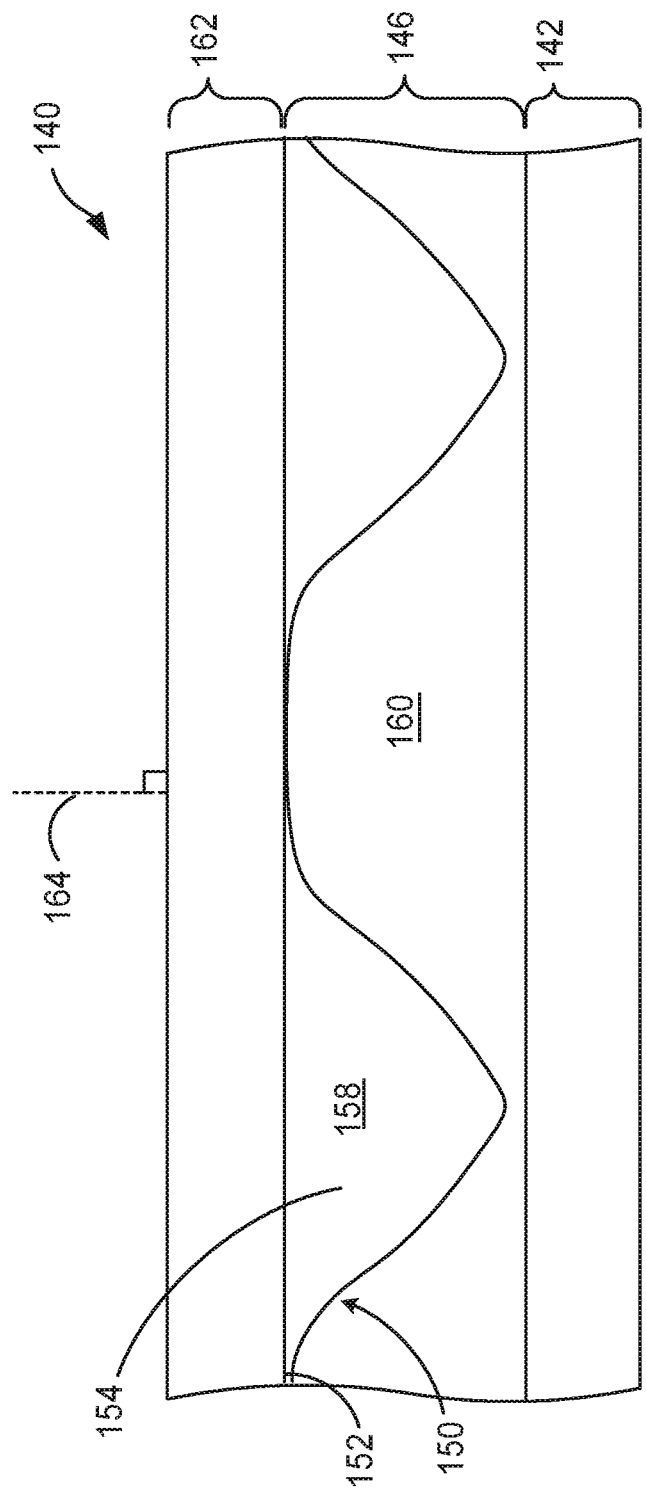
FIG. 7 is a conceptual and schematic lateral cross-sectional view of an example optical system.

FIG. 7 is a conceptual and schematic lateral cross-sectional view of an example optical system 140. In the example of FIG. 7, optical system 140 may include turning film 142, refractive lenticular diffuser 146, and LCD 162.

Turning film 142 and LCD 162 are as described in conjunction with FIGS. 1, 2A, and 2B, and may include the features as described in FIGS. 1, 2A, and 2B.

Refractive lenticular diffuser 146 may be as described in conjunction with FIGS. 1, 2A, and 2B, and may include the features as described in FIGS. 1, 2A, and 2B, except that refractive lenticular diffuser 146 is a refractive structure, not a catadioptric structure. As shown in FIG. 7, refractive lenticular diffuser 146 may include substantially smooth surface 152, first material 158 defining microstructures 154 having an arcuate cross sectional shape, and second material 160 adjacent structured surface 150. In the example of FIG. 7, microstructures 154 were formed with prism design tools that included the following parameters: pitch, sidewall base angles, sidewall radius of curvature, tip radius, valley radius, and flat section (at the end of the structure). These parameters were varied to achieve a desired light output distribution. As shown in FIG. 7, optical system 140 may have a display axis 164 that is substantially perpendicular to the center of the display surface. In the example of FIG. 7, first material 158 had a refractive index of 1.56, second material 160 was air with a refractive index of 1.00, and substantially smooth surface 152 of refractive lenticular diffuser 146 was adjacent LCD 162.

Figure 8:
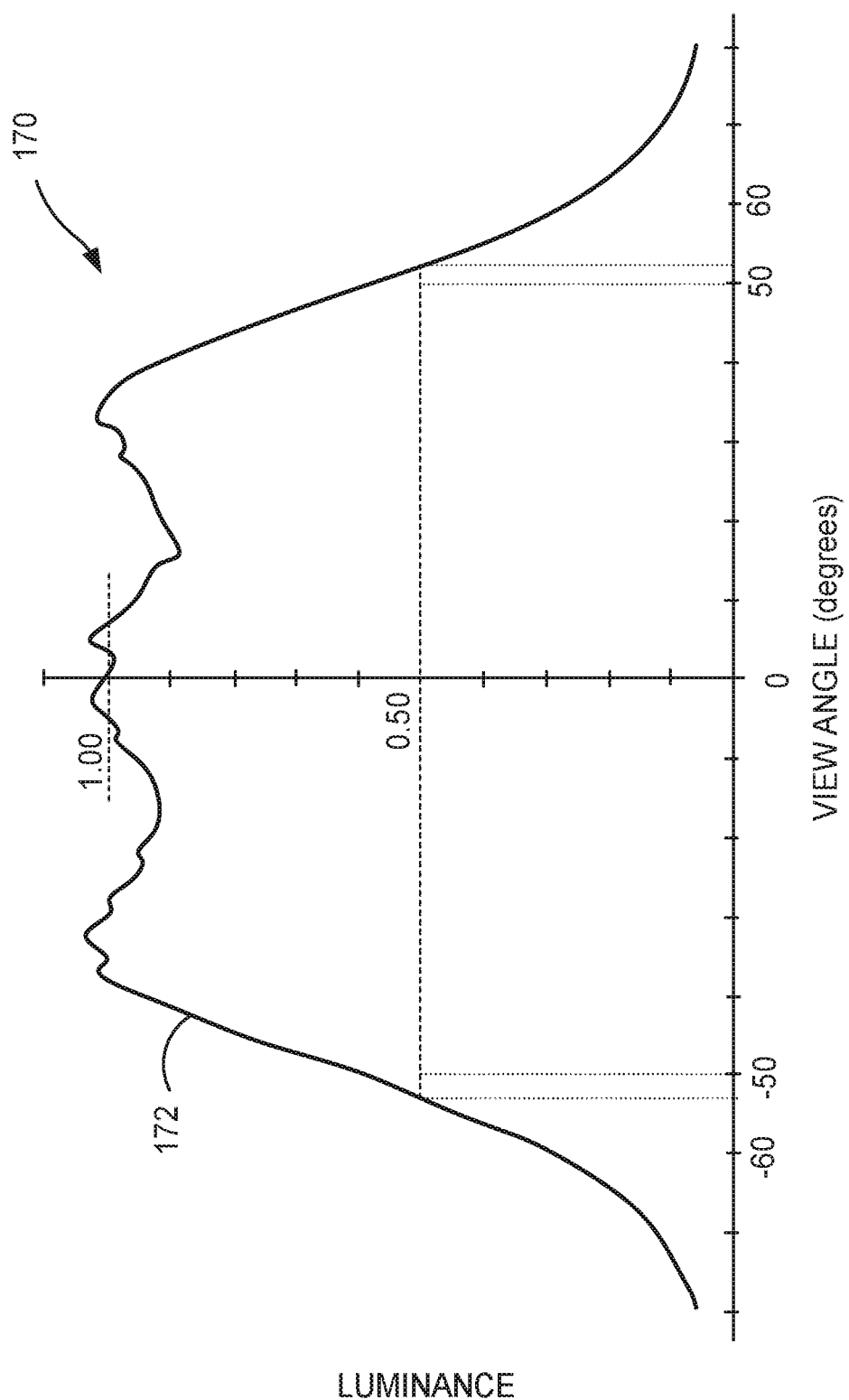
FIG. 8 is a chart presenting luminance as a function of view angle for the example optical system of FIG. 7.

FIG. 8 is a chart 170 presenting luminance as a function of view angle for the example optical system 140 of FIG. 7. The luminance was measured as a function of viewing angle from display axis 164, with zero degrees representing parallel alignment with display axis 164 (e.g., viewing display surface head-on) and ±90 degrees representing perpendicular alignment with display axis 164 (e.g., viewing the display surface from the side). Curve 172 illustrates that optical system 140 provided more than about ±50 degrees half width at half maximum (HWHM) from an input beam less than about ±20 degrees HWHM (i.e., luminance diminishes to half the maximum luminance at a viewing angle greater than about ±50 degrees).

Example 4

Figure 9:
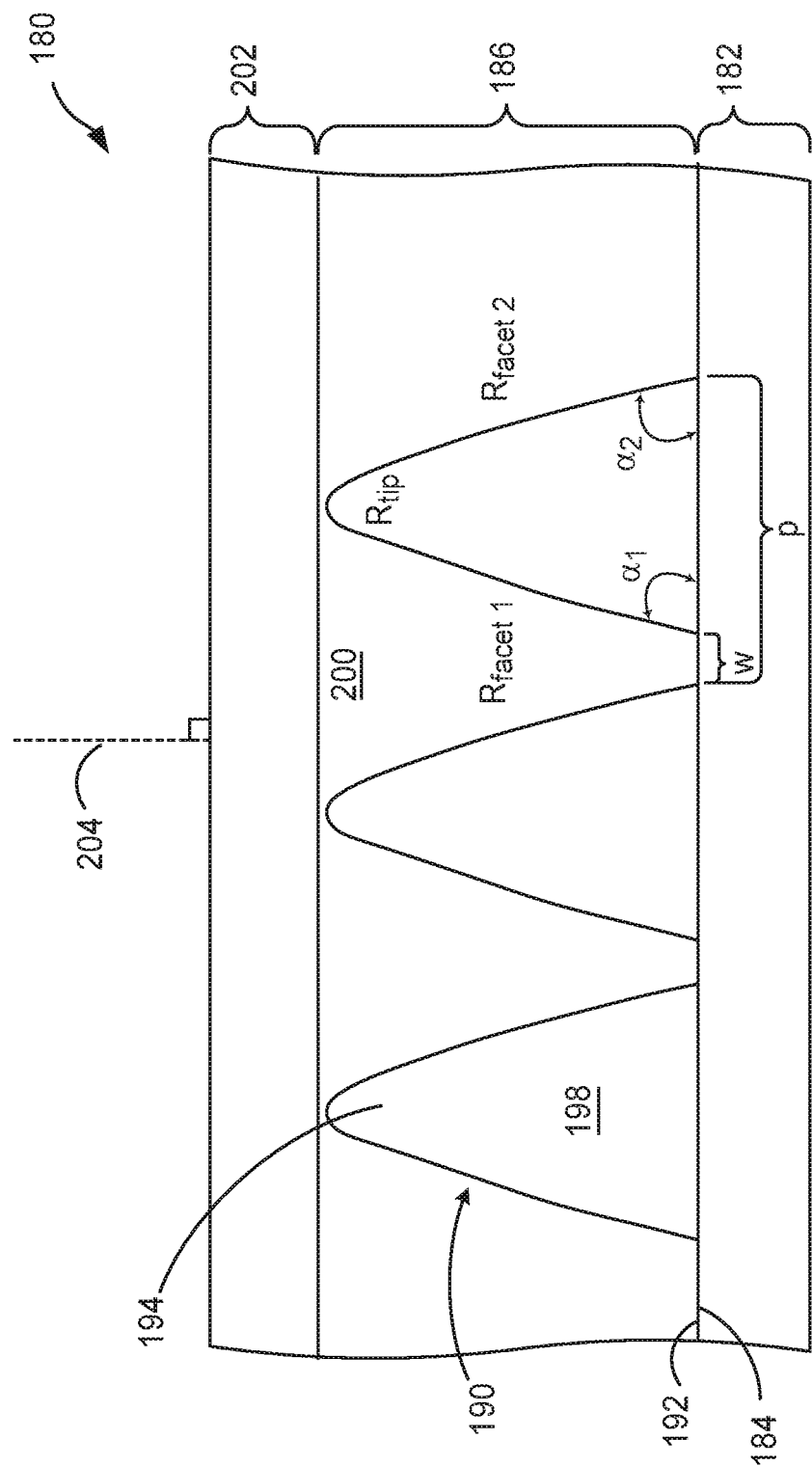
FIG. 9 is a conceptual and schematic lateral cross-sectional view of an example optical system.

FIG. 9 is a conceptual and schematic lateral cross-sectional view of an example optical system 180. In the example of FIG. 9, optical system 180 may include turning film 182, hybrid lenticular diffuser 186, and liquid crystal display (LCD) 202. Turning film 182 and LCD 202 are as described in conjunction with FIGS. 1, 2A, and 2B, and may include the features as described in FIGS. 1, 2A, and 2B.

Hybrid lenticular diffuser 186 may be as described in conjunction with FIGS. 1, 2A, and 2B, and may include the features as described in FIGS. 1, 2A, and 2B. As shown in FIG. 9, hybrid lenticular diffuser 186 may include substantially smooth surface 192, first material 198 defining microstructures 190 having an arcuate cross sectional shape, and second material 200 adjacent structured surface 196. In the example of FIG. 9, microstructures 190 were formed with prism design tools that included the following parameters: pitch (p), sidewall base angles ($\alpha_1$ and $\alpha_2$), sidewall radius of curvature ($R_{facet1}$ and $R_{facet2}$), tip radius ($R_{tip}$), valley radius ($R_{valley}$), and flat end width (w). The prism design tools parameters were varied to achieve a desired light output distribution as shown in Table 1.

TABLE 1

| Pitch, p (μm) | $\alpha_1$ (degrees) | $R_{valley}$ (μm) | $R_{facet1}$ (μm) | $R_{tip}$ (μm) | $\alpha_2$ (degrees) | $R_{facet2}$ (μm) | Flat End Width, w (μm) |
|---|---|---|---|---|---|---|---|
| 50 | 79 | 0 | 700 | 3 | 79 | 700 | 7 |

As shown in FIG. 9, optical system 180 may have a display axis 204 that is substantially perpendicular to the center of the display surface. In the example of FIG. 9, three pairs of first material 198 and second material 200 were analyzed, including first material 198 refractive indexes of 1.64, 1.67, and 1.7, and respective second material 200 refractive indexes of 1.44, 1.49a, and 1.50. In the example of FIG. 9, microstructures 190 were embedded on substantially smooth surface 184 of turning film 182.

Figure 10:
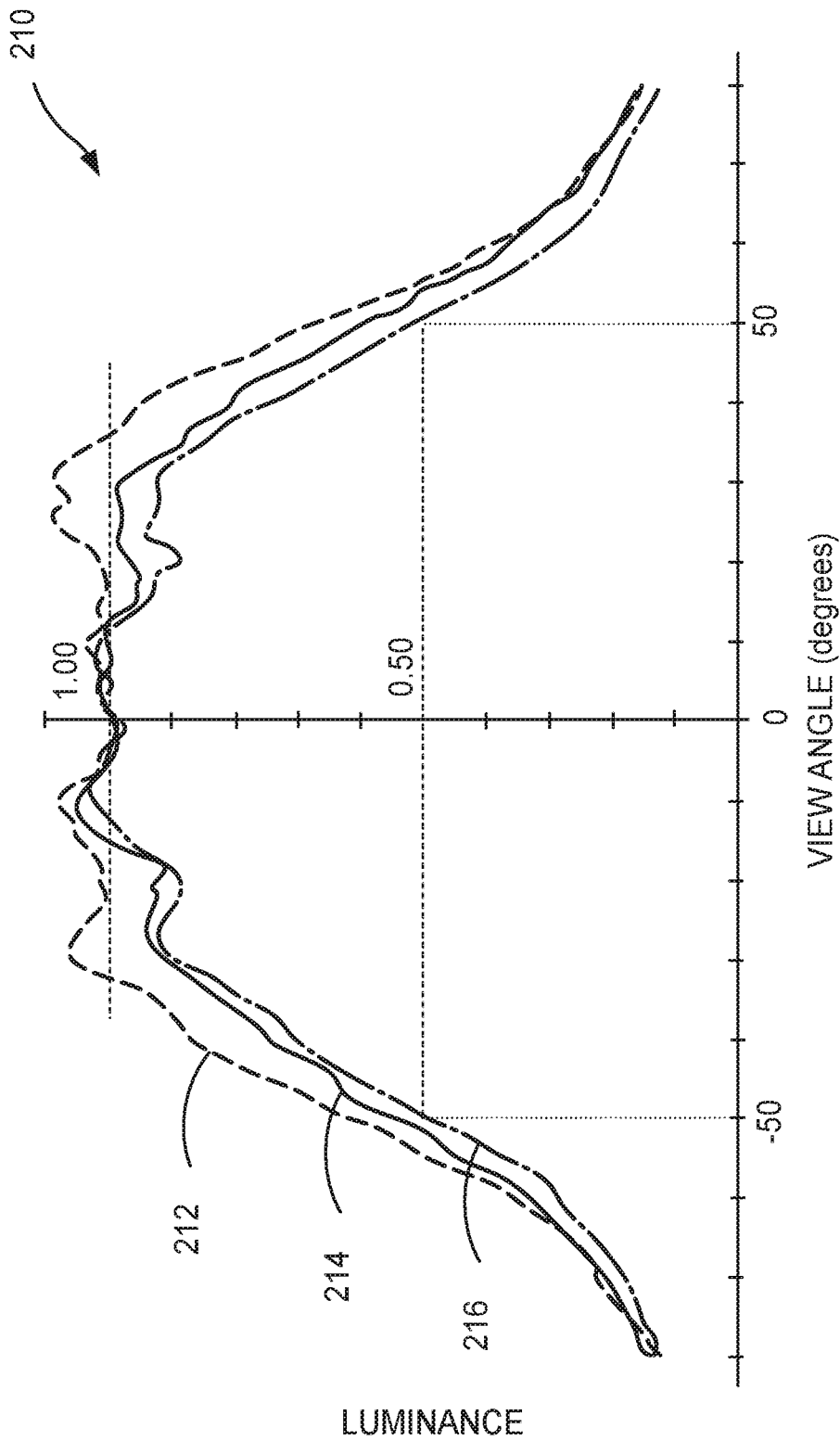
FIG. 10 is a chart presenting luminance as a function of view angle for the example optical system of FIG. 9.

FIG. 10 is a chart presenting luminance as a function of view angle for the example optical system 180 of FIG. 9. The luminance was measured as a function of viewing angle from display axis 204, with zero degrees representing parallel alignment with display axis 204 (e.g., viewing display surface head-on) and ±90 degrees representing perpendicular alignment with display axis 204 (e.g., viewing the display surface from the side). Curves 212, 214, 216 illustrate the luminance as a function of view angle for optical system 186. Curve 212 corresponds to the pair of first material 198 having a refractive index of 1.67 and second material 200 having a refractive index of 1.49. Curve 214 corresponds to the pair of first material 198 having a refractive index of 1.7 and second material 200 having a refractive index of 1.5. Curve 216 corresponds to the pair of first material 198 having a refractive index of 1.64 and second material 200 having a refractive index of 1.44. Curves 212, 214, 216 illustrate that optical system 180 provided more than about ±50 degrees half width at half maximum (HWHM) from an input beam less than ±20 degrees HWHM (i.e., luminance diminishes to half the maximum luminance at a viewing angle greater than ±50 degrees).

Example 5

Figure 11:
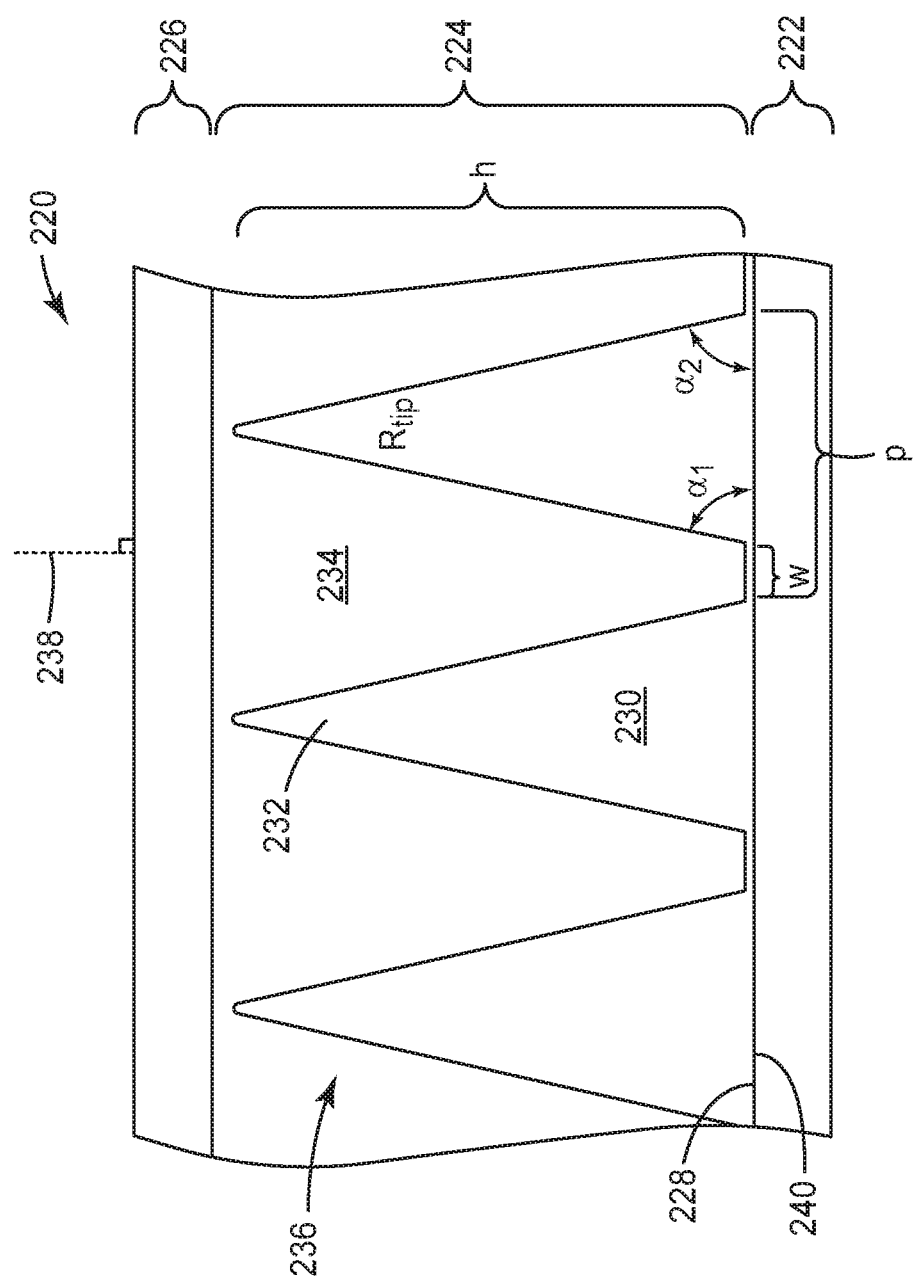
FIG. 11 is a conceptual and schematic lateral cross-sectional view of an example optical system.

FIG. 11 is a conceptual and schematic lateral cross-sectional view of an example optical system 220. In the example of FIG. 11, optical system 220 may include turning film 222, hybrid lenticular diffuser 224, and LCD 226. Turning film 222 and LCD 226 are as described in conjunction with FIGS. 1B, 2C and 2D and may include the features as described in FIGS. 1B, 2C and 2D.

Lenticular diffuser 224 may be described in conjunction with FIGS. 1B, 2C and 2D, and may include the features as described in FIGS. 1B, 2C and 2D. As Shown in FIG. 11, lenticular diffuser 224 may include substantially smooth surface 228, first material 230 defining microstructures 232 having a two-flat face prism and adjacent flat land area cross sectional shape, and second material 234 adjacent structured surface 236. In the example of FIG. 11, microstructures 232 were simulated using optical ray tracing software that modeled the following parameters: pitch (p), sidewall base angles ($\alpha_1$ and $\alpha_2$), tip radius ($R_{tip}$), land width (w), fill fraction (p−w)/p, aspect ratio (h/(p−w)), and the tip fraction ($R_{tip}$/p). These parameters were varied to achieve a set of desired light output distributions (target width) as shown in Table 2. For example, the modeling predicted that for a profile having a flat peak from −35 degrees to +35 degrees, the preferred prism design would be as shown in the first line of Table 2. The optimized luminance profile data outputs from the varied parameters in Table 2 are shown in Table 3.

TABLE 2

Design parameters varied to achieve desired light output distributions

| Target Width (degrees) | Pitch, p (μm) | Land Width, w (μm) | α1 (degrees) | $R_{tip}$ (μm) | α2 (degrees) | Fill Fraction, (p − w)/p | Aspect Ratio, h/(p − w) | Tip Fraction $R_{tip}$/p |
|---|---|---|---|---|---|---|---|---|
| ±35 | 29 | 3.944 | 79.1 | 1.014 | 79.1 | 0.864 | 2.42 | 0.035 |
| ±40 | 29 | 4.785 | 78.4 | 0.942 | 78.4 | 0.835 | 2.29 | 0.032 |
| ±45 | 29 | 5.249 | 77.9 | 1.016 | 77.9 | 0.819 | 2.17 | 0.035 |
| ±50 | 29 | 5.655 | 77.4 | 0.998 | 77.4 | 0.805 | 2.09 | 0.034 |
| ±60 | 29 | 6.554 | 76.2 | 1.026 | 76.2 | 0.774 | 1.89 | 0.035 |

TABLE 3

Luminance profile data outputs modeled towards desired light output distributions

| Target Width (degrees) | Half Width ½ Max (degrees) | Half Width 80% Max (degrees) | Half Width 90% Max (degrees) |
|---|---|---|---|
| ±35 | 52.5 | 41.7 | 36.6 |
| ±40 | 54.0 | 44.0 | 39.3 |
| ±45 | 55.6 | 46.6 | 41.7 |
| ±50 | 57.1 | 48.4 | 43.4 |
| ±60 | 61.5 | 53.9 | 49.0 |

As shown in FIG. 11, optical system 220 may have a display axis 238 that is substantially perpendicular to the center of the display surface. For the simulations of this example, first material 230 had a refractive index of 1.681 and absorption coefficient of 0.0104 per mm, second material 234 was a fill material with a refractive index of 1.486, and substantially smooth surface 228 of hybrid lenticular diffuser 224 was adjacent substantially smooth surface 240 of turning film.

Figure 12:
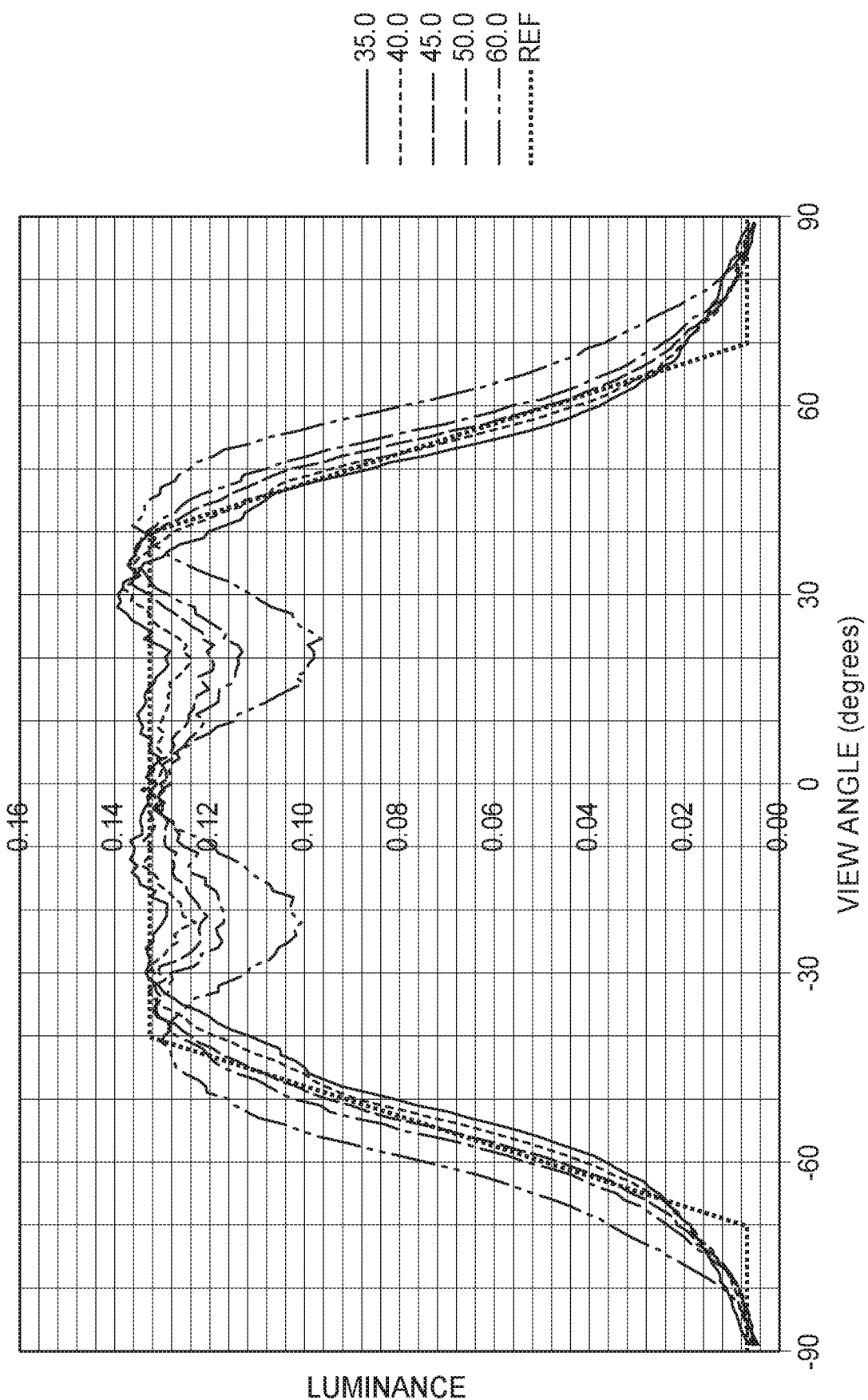
FIG. 12 is a chart presenting luminance as a function of view angle for the example optical system of Example 5.

FIG. 12 is a chart that shows the results of designing the lenticular diffuser structure of this example to have a flat top of various widths in the luminance profile with a range of 35 to 50 degrees as measured by the 90% of peak brightness roll-off. The Reference "REF" in FIG. 12 describes a desired luminance profile with a relative flat top and a target width of ±40 degrees. FIG. 12 shows it is possible to design a lenticular diffuser structure of Example 5 to have a relative flat top luminance profile in the range of 35 to 40 degrees, or even to 50 degrees. The luminance profile with a target width greater than 50 degrees exhibit strong modulation with the flat top of the luminance profile.

Example 6—Lenticular Diffuser 224—Horizontal Angular Luminance Profile Modulation by Fill Fraction In some cases, it may be desirable to reduce or eliminate the modulation that can occur in the otherwise flat top to favor less modulation and a top that is less flat but has a peak brightness in the center of the pattern that tends to roll-off more uniformly. With a hybrid lenticular diffuser 224 with α₁ and α₂ of 78 degrees (FIG. 13)/77 degrees (FIG. 14), $R_{tip}$ of 0.75 μm and p of 29.0 μm, a relatively flat top luminance profile may be achieved by adjusting the fill fraction ((p−w)/p).

Figure 13:
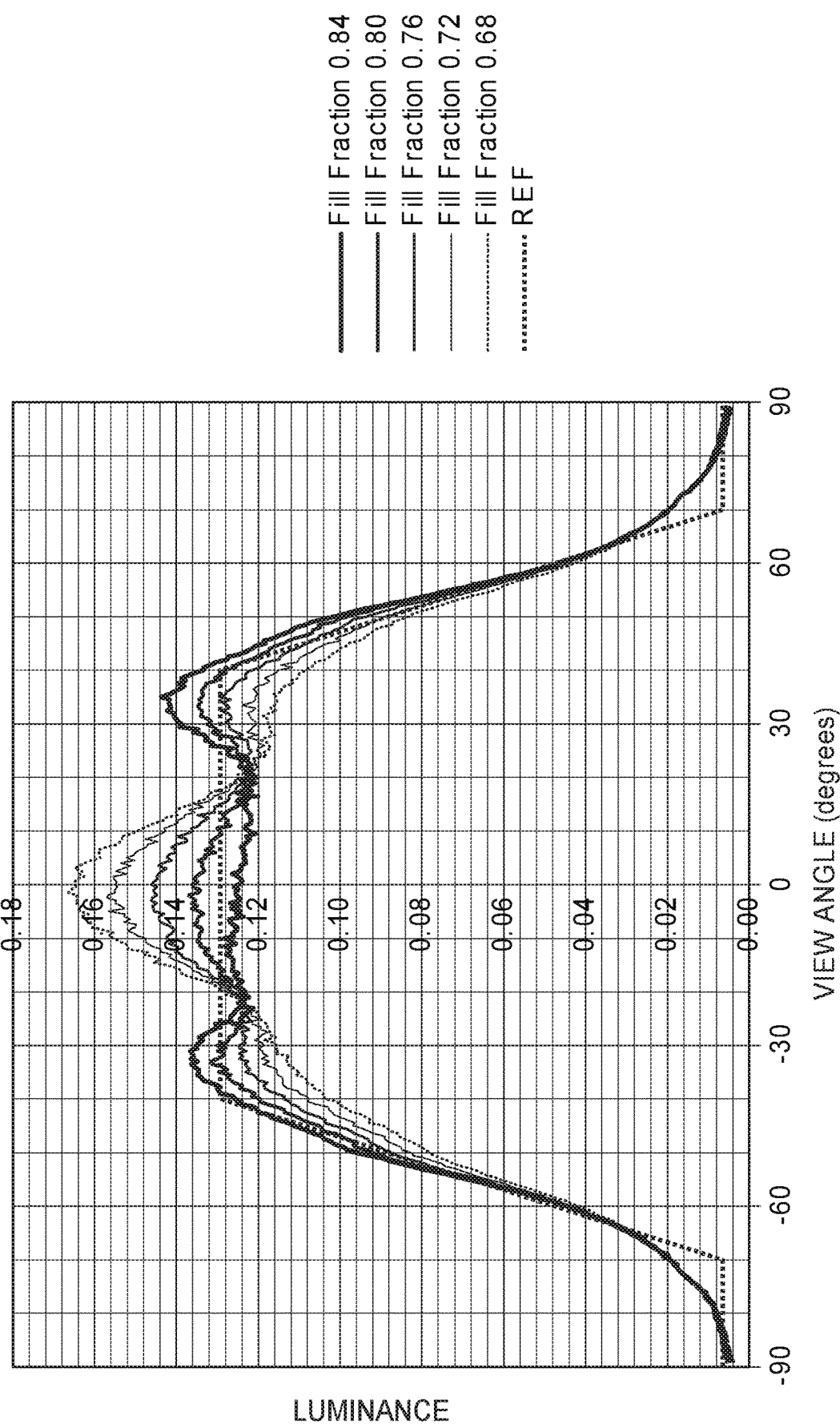
FIG. 13 is a chart presenting luminance as a function of view angle for the example optical system of Example 6.
Figure 14:
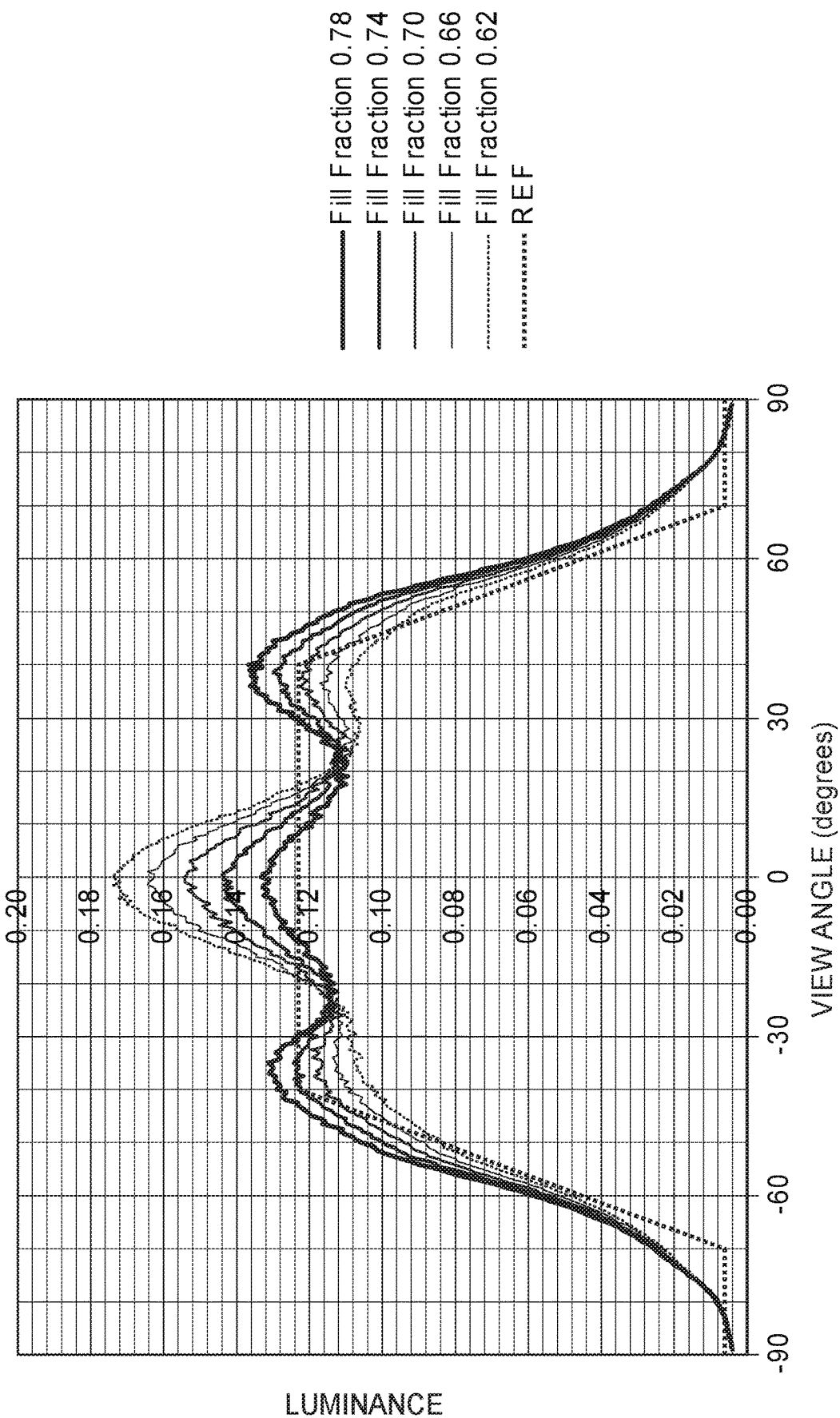
FIG. 14 is a chart presenting luminance as a function of view angle for the example optical system of Example 6.

FIG. 13 and FIG. 14 show luminance profiles by varying the fill fraction from 0.62 to 0.84 for two different sidewall base angles. The Reference "REF" in FIG. 13 and FIG. 14 describes a desired luminance profile with a relative flat top and a target width of ±40 degrees. The fill fraction range that yields a luminance profile with a relative flat top is 0.75 to 0.90. The fill fraction range that yields a desired luminance profile with a relative flat top is 0.80 to 0.87.

Example 7—Lenticular Diffuser 224—Luminance Profile Modulation by Tip Fraction

Figure 15:
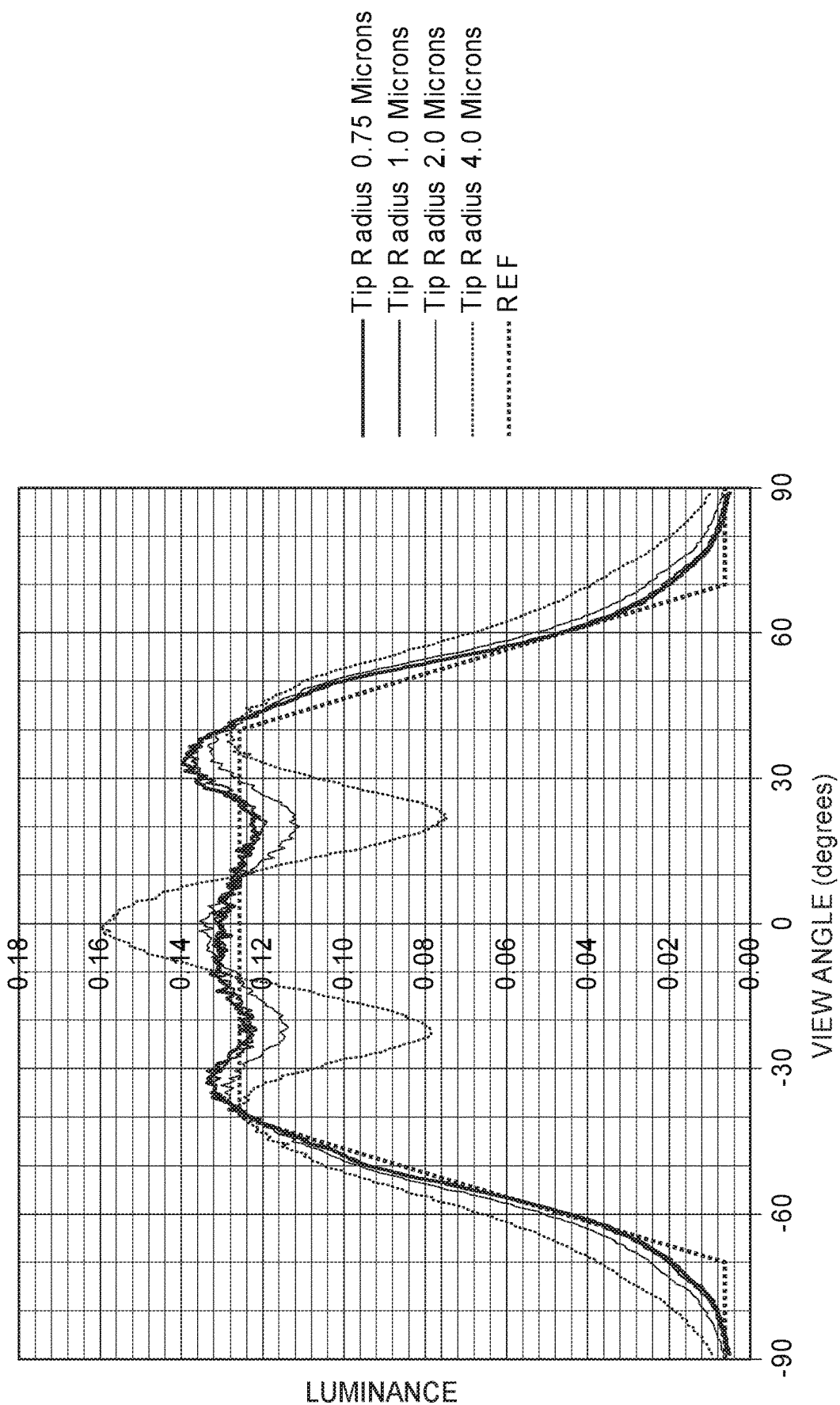
FIG. 15 is a chart presenting luminance as a function of view angle for the example optical system of Example 7.

Additionally, as in Example 6, it may be desirable to reduce or eliminate the modulation that can occur in the otherwise flat top to favor less modulation and a top that is less flat but has a peak brightness in the center of the pattern that tends to roll-off more uniformly. This can also be accomplished by adjusting the tip fraction and thereby the degree of reflected and refracted light in the optical system. In this example, lenticular diffuser 224 has α₁ and α₂ of 78 degrees, fill fraction of 0.82 and pitch of 29.0 μm FIG. 15 shows that for a tip radius less than 1 micron, where the pitch is 29.0 μm, that the effect of $R_{tip}$ changes are small. For a $R_{tip}$ larger than 2 μm, the tip radius appears to increase top modulation significantly. The Reference "REF" in FIG. 15 describes a desired luminance profile with a relative flat top and a target width of ±40 degrees. The $R_{tip}$ range that yields a desired luminance profile with a relative flat top is 0 μm to about 1 μm. The tip fraction that achieves a luminance profile with a relative flat top is less than 0.100. The tip fraction that achieves a desired luminance profile with a relative flat top is less than 0.035.

Figure 16:
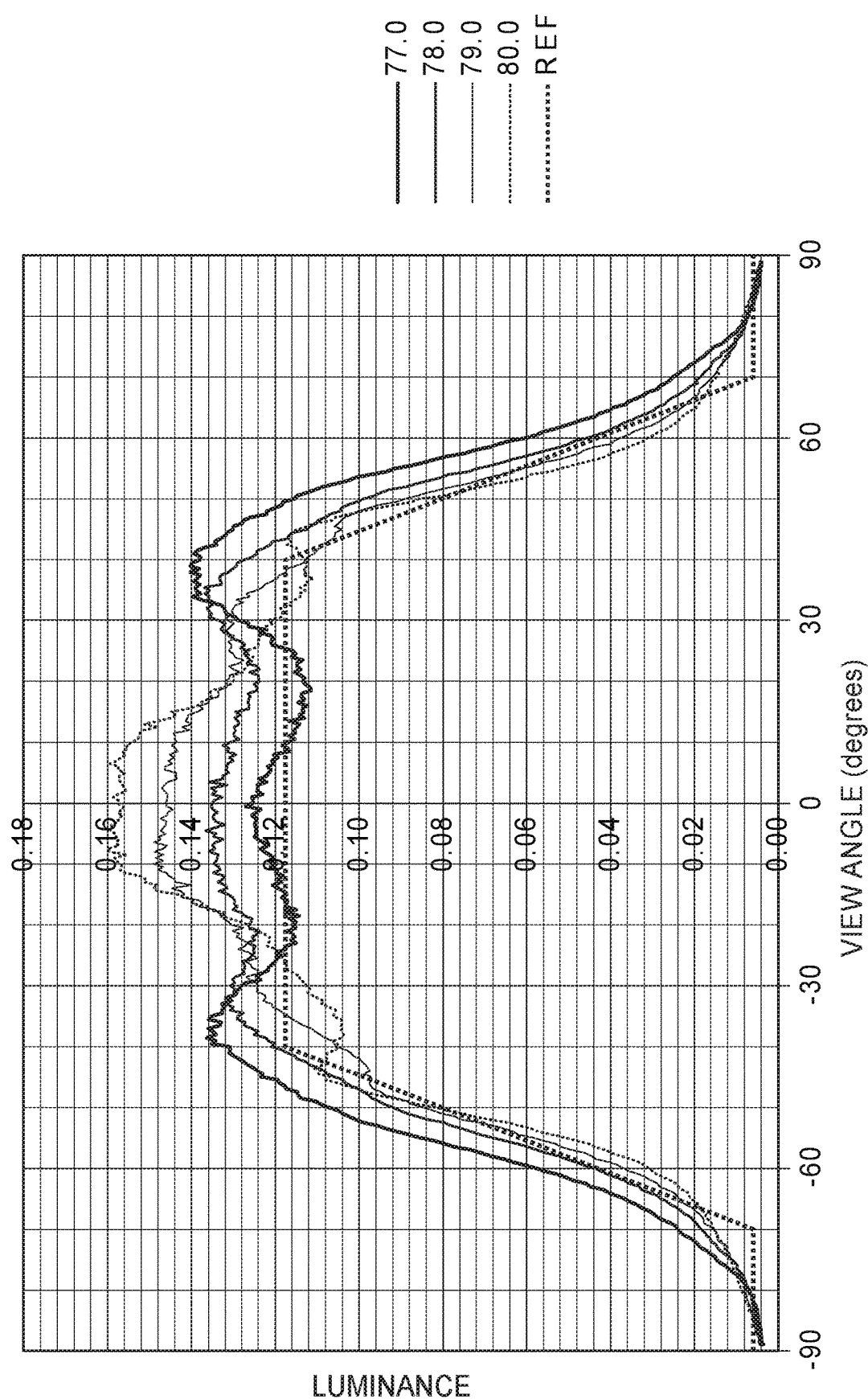
FIG. 16 is a chart presenting luminance as a function of view angle for the example optical system of Example 8.

Example 8—Lenticular Diffuser 224—Luminance Profile Modulation by Sidewall Base Angles FIG. 16 shows horizontal angular luminance profiles with similar hybrid lenticular diffuser 224 design parameters and varying sidewall base angles. Each horizontal angular luminance profile is represented in FIG. 16 by the sidewall base angle, 77.0, 78.0, 79.0 and 80.0 associated with each model. The other design parameters of the modeled lenticular diffuser 224 include: a 0.017 tip fraction, a 44 μm pitch, and a 0.80 fill fraction. The Reference "REF" in FIG. 16 describes a desired luminance profile with a relative flat top and a target width of ±40 degrees. In this example, a structure with sidewall base angles of 78 degrees achieves the most relatively flat top profile where the target width is about ±40 degrees.

Example 9—Comparison of Luminance Profiles from Fabricated Lenticular Diffusers

Figure 17:
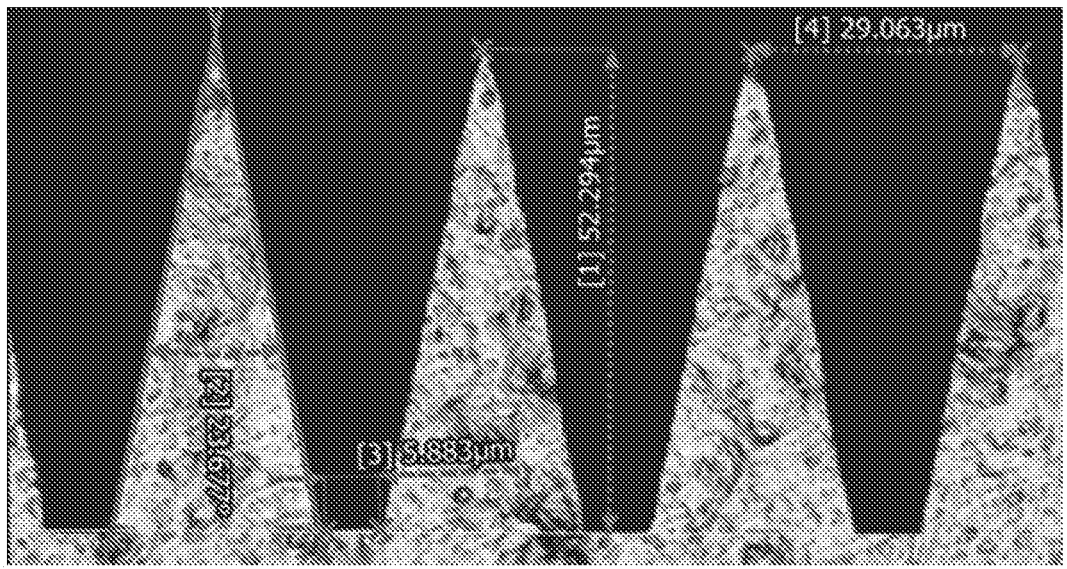
FIG. 17 is an image of a cross-section of a lenticular diffuser of Example 9.
Figure 18:
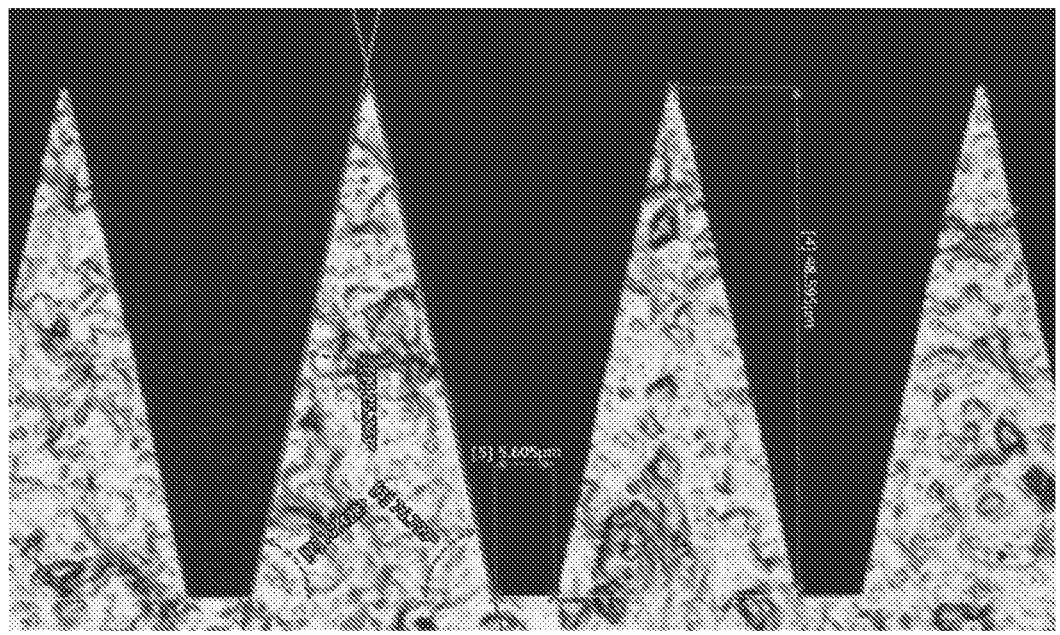
FIG. 18 is an image of a cross-section of a lenticular diffuser of Example 9.
Figure 19:
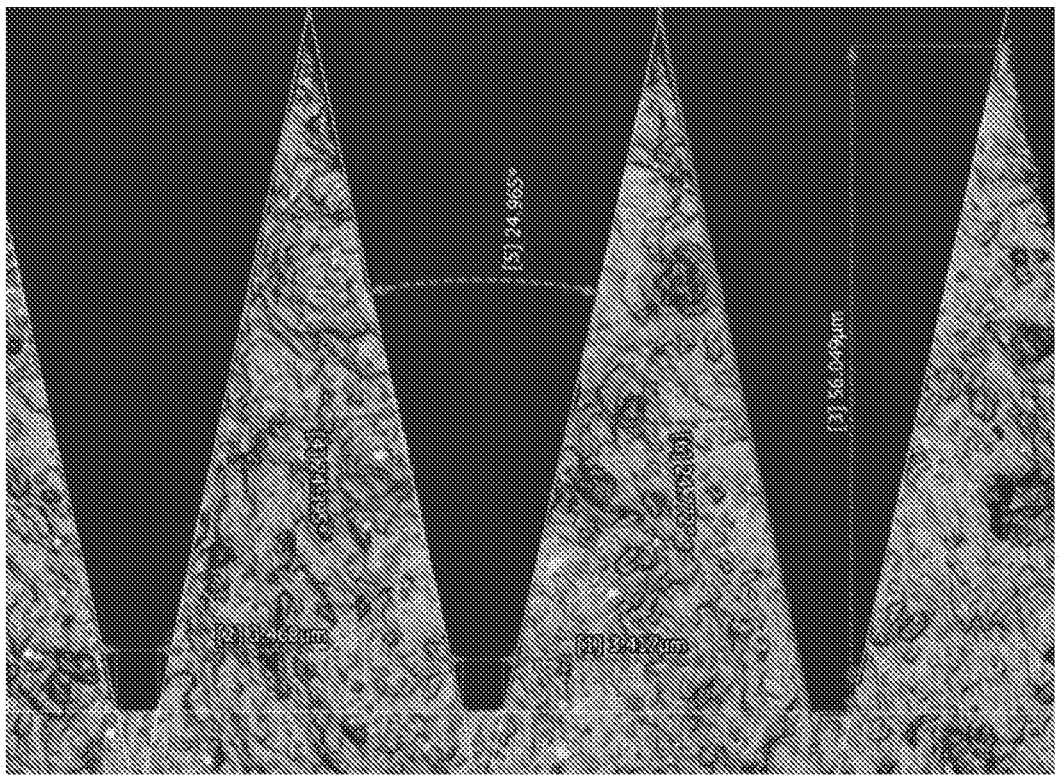
FIG. 19 is an image of a cross-section of a lenticular diffuser of Example 9.

A Diffuser, B Diffuser, and C diffuser samples were prepared with microreplication tools that were fabricated using methods well known in the art and described above. Three lenticular diffusers from tools having the geometries shown in the scanning electron microscope (SEM) images in FIGS. 17-19 were made via microreplication of a high-refractive index UV curable resin onto PET film. The design parameters of each sample are provided in Table 4. Samples were overcoated with a commercially available optically clear adhesive which was also UV-cured (refractive index 1.47).

TABLE 4

Measured design parameters of A, B, and C Diffuser samples

| Diffuser | Pitch, p (μm) | Land Width, w (μm) | α1 (degrees) | α2 (degrees) | Fill Fraction, (p − w)/p | Aspect Ratio, h/(p − w) |
|---|---|---|---|---|---|---|
| A | 29 | 5.883 | 78.2 | 78.2 | 0.80 | 2.25 |
| B | 29 | 5.605 | 77.4 | 76.8 | 0.81 | 2.08 |
| C | 29 | 3.468 | 77.8 | 77.8 | 0.88 | 2.19 |

Each of A Diffuser, B Diffuser, and C Diffuser was placed on top of a XPS 11 LG backlight, available from Dell (Texas, USA), where the white reflector of the backlight was replaced with an enhanced specular reflector, commercially available from 3M Company (Minnesota, USA). The enhanced specular reflector helps preserve collimation of the backlight. The LCD panel for each sample was an LCD panel from an XPS 13 device, commercially available from Dell (Texas, USA).

Figure 20:
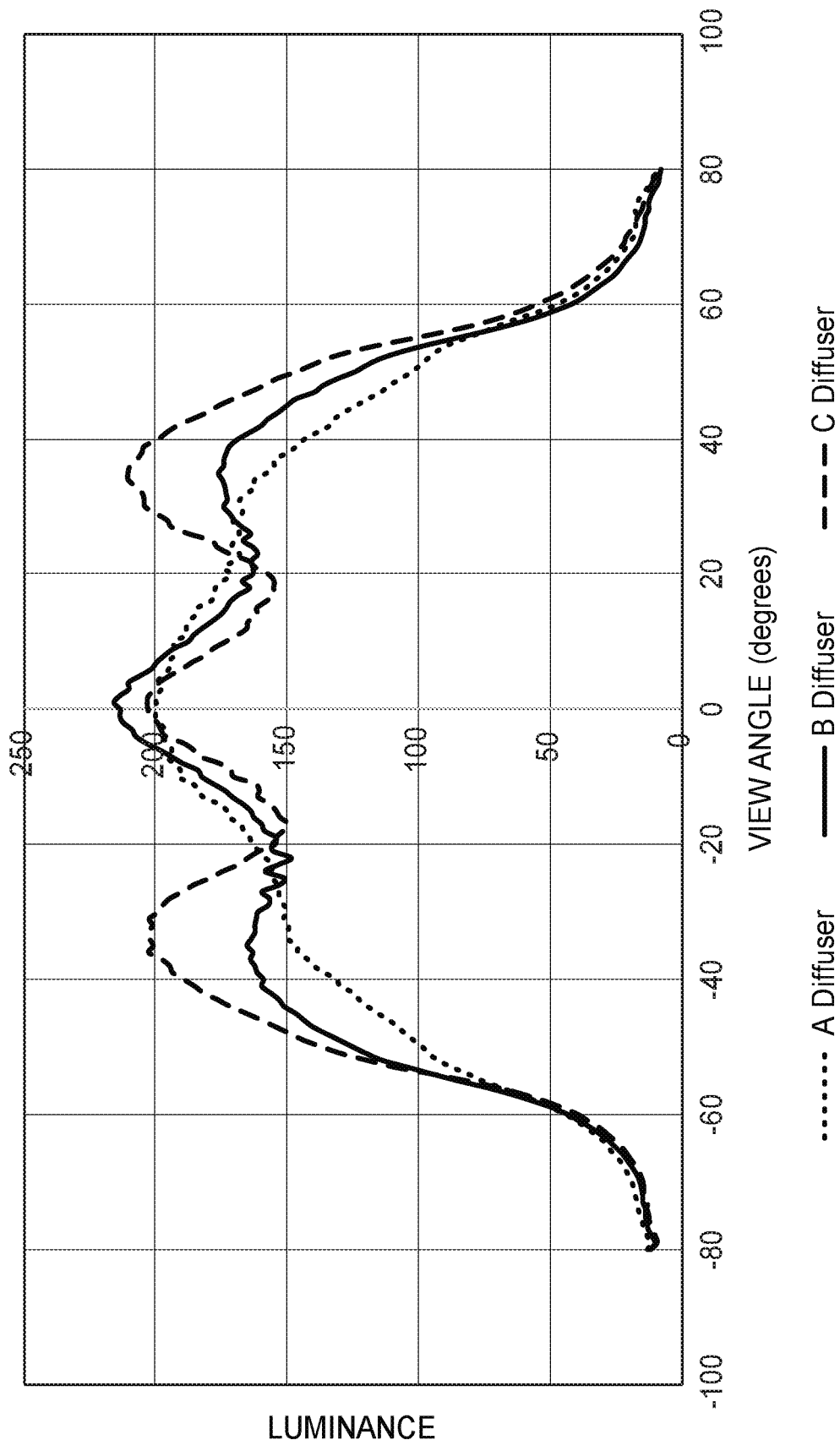
FIG. 20 is a chart presenting luminance as a function of view angle for the example optical systems of Example 9.

The angular distribution of light from a turning film system was determined using an L80 conoscope available from Eldim (Herouville Saint Clair, France) for turning film systems with the samples described above. Measurements were made with the diffuser placed on top the Dell XPS 11 LG backlight where the stock white reflector was replaced with a 3M enhanced specular reflector to aid in collimation preservation. FIG. 20 shows that the luminance distribution can be controlled by varying the geometry of the lenticular diffuser. A Diffuser and B Diffuser in FIG. 20 demonstrate a luminance profile with a relatively flat top. C Diffuser in FIG. 20 shows a luminance profile with greater modulation of the flat top.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An optical system, comprising:
a backlight light guide, wherein the backlight light guide outputs substantially collimated light;
a turning film, comprising:
a first substantially smooth surface substantially perpendicular to a display axis; and
a first structured surface comprising a plurality of first microstructures defining a first plurality of substantially parallel grooves,
wherein the turning film is adjacent to the backlight light guide, wherein the turning film outputs light substantially collimated in a first plane; and
a lenticular diffuser, comprising:
a second substantially smooth surface substantially perpendicular to the display axis; and
a second structured surface comprising a plurality of second microstructures defining a second plurality of substantially parallel grooves extending along a plane substantially perpendicular to the display axis, at least one second microstructure defining a sidewall base angle between 75 degrees and 80 degrees,
wherein the lenticular diffuser is optically coupled to the turning film, wherein the lenticular diffuser reflects or refracts light substantially collimated in the first plane toward a second plane substantially perpendicular to the first plane;
wherein the first plurality of substantially parallel grooves is substantially perpendicular to the second plurality of substantially parallel grooves.

2. The optical system of claim 1, wherein the lenticular diffuser further comprises a first material having a first refractive index, wherein the first material forms the plurality of second microstructures.

3. The optical system of claim 2, wherein the plurality of second microstructures each comprises a hybrid lenticular prism, wherein a cross section of each hybrid lenticular prism extends along a plane substantially parallel to the display axis in a direction from the second substantially smooth surface to a vertex, wherein the plurality of second microstructures defines the second plurality of substantially parallel grooves.

4. The optical system of claim 3, wherein the lenticular diffuser further comprises a second material having a second refractive index, wherein the second material is adjacent the first material, wherein the first refractive index is greater than the second refractive index.

5. The optical system of claim 4, wherein the difference between the first refractive index and the second refractive index is between about 0.05 and about 0.6.

6. The optical system of claim 4, wherein the difference between the first refractive index and the second refractive index is between about 0.1 and about 0.3.

7. The optical system of claim 4, wherein the difference between the first refractive index and the second refractive index is between about 0.15 and about 0.25.

8. The optical system of claim 3, wherein the hybrid lenticular prism comprises continuous, curve-faced prisms.

9. The optical system of claim 3, wherein the hybrid lenticular prism comprises arcuate prisms.

10. The optical system of claim 3, wherein the plurality of first microstructures comprises a plurality of two-sided, straight-facet prisms.

11. The optical system of claim 3, wherein the plurality of first microstructures comprises a plurality of multifaceted prisms.

12. The optical system of claim 1, wherein the first substantially smooth surface is adjacent the second substantially smooth surface.

13. The optical system of claim 1, wherein the first substantially smooth surface is adjacent the second structured surface.

14. The optical system of claim 13, wherein at least a portion of the plurality of second microstructures is at least partially embedded in the first substantially smooth surface.

15. The optical system of claim 1, wherein the lenticular diffuser is configured to provide greater than about ±40 degrees half width at half maximum (HWHM) luminance from an input light beam less than about ±30 degrees HWHM.

16. The optical system of claim 1, wherein the lenticular diffuser is configured to provide greater than about ±50 degrees half width at half maximum (HWHM) luminance from an input light beam less than about ±20 degrees HWHM.

17. The optical system of claim 1, wherein the optical system further comprises a liquid crystal display, wherein the lenticular diffuser is optically coupled to the liquid crystal display.

18. An optical system, comprising:
a turning film, comprising:
- a first substantially smooth surface, wherein the first substantially smooth surface defines a display axis extending perpendicular to the first substantially smooth surface; and
- a first structured surface comprising a plurality of two-sided, straight-facet prisms or a plurality of multifaceted prisms comprising a first material having a first refractive index, wherein the plurality of two-sided, straight-facet prisms or the plurality of multifaceted prisms define a first plurality of substantially parallel grooves on the first structured surface extending substantially perpendicular to the display axis; and
- a second material having a second refractive index, wherein the second material is adjacent the plurality of two-sided, straight-facet prisms or the plurality of multifaceted prism, wherein the first refractive index is greater than the second refractive index; and a lenticular diffuser, comprising:
- a second substantially smooth surface, wherein the second substantially smooth surface is substantially perpendicular to the display axis; and
- a second structured surface, wherein the second structured surface comprises a plurality of second microstructures each comprising a prism comprising a third material having a third refractive index, wherein a cross section of each prism extends along a plane substantially parallel to the display axis in a direction from the second substantially smooth surface to a vertex, wherein the plurality of second microstructures define a second plurality of substantially parallel grooves on the second structured surface extending along a plane substantially perpendicular to the display axis, at least one second microstructure having a tip fraction below 0.1; and
- a fourth material having a fourth refractive index, wherein the fourth material is adjacent the plurality of second microstructures, wherein the difference between the third refractive index and the fourth refractive index is between about 0.1 and about 0.3, wherein the lenticular diffuser is optically coupled to the turning film;

wherein the first plurality of grooves is substantially orthogonal to the second plurality of grooves, wherein the lenticular diffuser is configured to provide greater than about ±40 degrees half width at half maximum (HWHM) luminance from an input beam less than about ±20 degrees HWHM.

19. The optical system of claim 18, wherein at least a portion of the plurality of second microstructures is at least partially embedded in the first substantially smooth surface, wherein the lenticular diffuser is configured to provide greater than about ±50 degrees half width at half maximum (HWHM) luminance from an input beam less than about ±20 degrees HWHM.

20. An optical system, comprising:
a turning film, comprising:
- a first substantially smooth surface, wherein the first substantially smooth surface defines a display axis extending perpendicular to the first substantially smooth surface; and
- a first structured surface comprising a plurality of two-sided, straight-facet prisms or a plurality of multifaceted prisms comprising a first material having a first refractive index, wherein the plurality of two-sided, straight-facet prisms or the plurality of multifaceted prisms define a first plurality of substantially parallel grooves on the first structured surface extending substantially perpendicular to the display axis; and
- a second material having a second refractive index, wherein the second material is air, wherein the second material is adjacent the plurality of two-sided, straight-facet prisms or the plurality of multifaceted prism, wherein the first refractive index is greater than the second refractive index; and a lenticular diffuser, comprising:
- a second substantially smooth surface, wherein the second substantially smooth surface is substantially perpendicular to the display axis; and
- a second structured surface, wherein the second structured surface comprises a plurality of second microstructures each comprising a prism comprising a third material having a third refractive index, wherein a cross section of each prism extends along a plane substantially parallel to the display axis in a direction from the second substantially smooth surface to a vertex, wherein the plurality of second microstructures define a second plurality of substantially parallel grooves on the second structured surface extending along a plane substantially perpendicular to the display axis, at least one second microstructure having a tip fraction below 0.1 and at least one second microstructure defining a sidewall base angle between 75 degrees and 80 degrees; and
- a fourth material having a fourth refractive index, wherein the fourth material is adjacent the plurality of second microstructures, wherein the difference between the third refractive index and the fourth refractive index is between about 0.1 and about 0.3, wherein the lenticular diffuser is optically coupled to the turning film;

wherein the first plurality of grooves is substantially orthogonal to the second plurality of grooves, wherein the first substantially smooth surface is adjacent the second substantially smooth surface, wherein the lenticular diffuser is configured to provide greater than about ±50 degrees half width at half maximum (HWHM) luminance from an input beam less than about ±20 degrees HWHM.

21. The optical system of claim 20, wherein at least a portion of the plurality of second microstructures is at least partially embedded in the first substantially smooth surface.

* * * * *